(12) United States Patent
Haneda

(10) Patent No.: US 10,541,600 B2
(45) Date of Patent: Jan. 21, 2020

(54) POWER FACTOR IMPROVEMENT DEVICE

(71) Applicant: NTN CORPORATION, Osaka-shi, Osaka (JP)

(72) Inventor: Masaji Haneda, Shiga (JP)

(73) Assignee: NTN Corporation, Osaka-shi (JP)

(*) Notice: Subject to any disclaimer, the term of this patent is extended or adjusted under 35 U.S.C. 154(b) by 0 days.

(21) Appl. No.: 16/308,795

(22) PCT Filed: Mar. 22, 2017

(86) PCT No.: PCT/JP2017/011363
§ 371 (c)(1),
(2) Date: Dec. 10, 2018

(87) PCT Pub. No.: WO2017/212739
PCT Pub. Date: Dec. 14, 2017

(65) Prior Publication Data
US 2019/0149038 A1   May 16, 2019

(30) Foreign Application Priority Data
Jan. 23, 2017   (JP) .................................. 2017-009178

(51) Int. Cl.
*H02M 1/42* (2007.01)
*H02M 1/08* (2006.01)
(Continued)

(52) U.S. Cl.
CPC ......... *H02M 1/4216* (2013.01); *H02M 1/084* (2013.01); *H02M 7/12* (2013.01);
(Continued)

(58) Field of Classification Search
CPC .... H02M 1/42; H02M 1/4208; H02M 1/4216; H02M 1/4233; H02M 1/4241;
(Continued)

(56) References Cited

U.S. PATENT DOCUMENTS 4,513,361 A * 4/1985 Rensink .................. H02M 7/10
   323/222
4,814,965 A * 3/1989 Petersen ............... H02M 3/285
   363/21.12
(Continued)

FOREIGN PATENT DOCUMENTS

JP   S6113207 A   6/1986
JP   H0731150 A   1/1995
(Continued)

OTHER PUBLICATIONS

Japan Patent Office, International Search Report and Written Opinion of the International Searching Authority, dated May 16, 2017, in PCT/JP2017/011363, which is the international application to this U.S. application.
(Continued)

*Primary Examiner* — Gustavo A Rosario-Benitez
(74) *Attorney, Agent, or Firm* — Kolitch Romano LLP

(57) ABSTRACT

A power factor correction device for three-phase AC-DC conversion enables effective correction and stable power conversion with a simple construction and control system. The device may include input terminals to which three-phase AC is inputted, and Positive and negative electrode terminals each connected to a load device. Transformers each have a primary coil with an end connected to the input terminals. Switching element(s) have ends applied with the voltage of another end of the primary coil, other ends connected to a common potential terminal on the side of the primary coil, and control ends. Rectifying devices have ends applied with the voltage of another end of the secondary coil so as to pass current flow into the positive electrode terminal. A smoothing condenser is disposed between the positive and negative electrode terminals. The control ends of the
(Continued)

switching elements are controlled by a control signal having a constant duty ratio.

9 Claims, 22 Drawing Sheets

(51) Int. Cl.
| | | |
|---|---|---|
| *H02M 7/08* | | (2006.01) |
| *H02M 7/23* | | (2006.01) |
| *H02M 1/084* | | (2006.01) |
| *H02M 7/12* | | (2006.01) |
| *H02M 1/00* | | (2006.01) |

(52) U.S. Cl.
CPC ................ *H02M 7/23* (2013.01); *H02M 7/08* (2013.01); *H02M 2001/0048* (2013.01)

(58) Field of Classification Search
CPC ............. H02M 1/4258; H02M 1/4266; H02M 2001/007; H02M 2001/0077; H02M 7/02; H02M 7/04; H02M 7/06; H02M 7/08; H02M 7/153; H02M 7/217; H02M 7/2176; H02M 7/23
See application file for complete search history.

(56) References Cited

U.S. PATENT DOCUMENTS

| | | | | |
|---|---|---|---|---|
| 5,019,954 | A * | 5/1991 | Bourgeault | H02M 1/4258 363/21.12 |
| 5,506,766 | A | 9/1996 | Takahashi | |
| 5,619,400 | A | 4/1997 | Bowman et al. | |
| 5,731,969 | A * | 3/1998 | Small | H02M 1/4216 363/126 |
| 7,639,520 | B1 * | 12/2009 | Zansky | H02M 1/4225 363/65 |
| 9,413,221 | B1 * | 8/2016 | Kim | H02M 1/32 |
| 2006/0209571 | A1 * | 9/2006 | Aso | H02M 3/33592 363/21.01 |
| 2008/0054874 | A1 | 3/2008 | Chandrasekaran et al. | |
| 2008/0297126 | A1 | 12/2008 | Nagano et al. | |
| 2010/0133905 | A1 | 6/2010 | Chang et al. | |
| 2014/0016368 | A1 | 1/2014 | Chandrasekaran et al. | |
| 2014/0140104 | A1 * | 5/2014 | Norrga | H02J 3/36 363/17 |
| 2014/0240051 | A1 * | 8/2014 | Buono | H03F 3/183 330/297 |
| 2015/0162823 | A1 * | 6/2015 | Partridge | H02M 1/4216 363/21.12 |
| 2016/0065077 | A1 * | 3/2016 | Yamada | H02M 1/42 363/21.01 |
| 2016/0069938 | A1 * | 3/2016 | Wu | G01R 19/165 361/18 |
| 2017/0047744 | A1 * | 2/2017 | Kim | H02M 1/36 |
| 2017/0063215 | A1 * | 3/2017 | Nikitin | H02M 1/12 |
| 2017/0187215 | A1 | 6/2017 | Noda | |

FOREIGN PATENT DOCUMENTS

| | | |
|---|---|---|
| JP | H07222443 A | 8/1995 |
| JP | H08331860 A | 12/1996 |
| JP | H1141938 A | 2/1999 |
| JP | 2002010632 A | 1/2002 |
| JP | 2003017136 A | 1/2003 |
| JP | 2003199344 A | 7/2003 |
| JP | 2005218224 A | 8/2005 |
| JP | 2007037297 A | 2/2007 |
| JP | 2007097297 A | 4/2007 |
| JP | 2008113537 A | 5/2008 |
| JP | 2011147325 A | 7/2011 |
| JP | 2013090491 A | 5/2013 |
| JP | 2013128379 A | 6/2013 |
| JP | 2013158168 A | 8/2013 |
| JP | 2013163418 A | 8/2013 |
| JP | 2014023286 A | 2/2014 |
| JP | 2014110680 A | 6/2014 |
| JP | 2016039742 A | 3/2016 |
| WO | 2014141371 A1 | 9/2014 |

OTHER PUBLICATIONS

Japan Patent Office, International Search Report and Written Opinion of the International Searching Authority, dated Jun. 6, 2017, in PCT/JP2017/017469, which is a related international application of Applicant NTN Corporation.

Japan Patent Office, International Search Report and Written Opinion of the International Searching Authority, dated Jul. 11, 2017, in PCT/JP2017/017467, which is a related international application of Applicant NTN Corporation.

U.S. Patent and Trademark Office, Office Action in U.S. Appl. No. 16/308,801 dated May 2, 2019, which is a co-pending application of Applicant NTN Corporation.

* cited by examiner

POWER FACTOR IMPROVEMENT DEVICE

TECHNICAL FIELD

The present disclosure relates to a power factor correction device in which three-phase alternating current is converted into direct current.

INTRODUCTION

Conventionally known are power factor correction devices (also referred to as "PFC"s) for converting alternating current (AC) into direct current (DC), using a boosting converter in which power factor is corrected by boosting input voltage and making input current have the same sine waveform as the input voltage. In various known methods used both for single-phase AC input and three-phase AC input, it is common to arrange a boosting converter after AC is rectified in rectifying circuits (refer to Patent Documents 1 to 7). Patent Documents 6 to 7 disclose devices which boost and correct power factor of three-phase AC output from generators of wind power plants.

In conventional-type power factor correction devices which employ boosting converters, control signals having complicated waveforms are generated using techniques such as PWM modulation so as to enable complicated switch control, such as providing different control signals to different switching elements, shifting switch the timing of each switching element, etc.

In a type of power factor correction device in which the input terminals and the output terminals need to be insulated, an additional DC/DC convertor for insulation is arranged on the output side of a boosting converter.

PRIOR ART DOCUMENT

Patent Document

Patent Document 1: Japanese Patent Laid-open No. H07-31150.
Patent Document 2: Japanese Patent Laid-open No. H08-331860.
Patent Document 3: Japanese Patent Laid-open No. 2002-10632.
Patent Document 4: Japanese Patent Laid-open No. 2005-218224.
Patent Document 5: Japanese Patent Laid-open No. 2007-37297.
Patent Document 6: Japanese Patent Laid-open No. 2013-128379.
Patent Document 7: Japanese Patent Laid-open No. 2014-23286.
Patent Document 8: Japanese Patent Laid-open No. 2003-199344.

SUMMARY

Problems to be Solved

In an AC power generator using natural energy such as wind power, the output largely fluctuates. Accordingly, switch control of a boosting converter in a power factor correction device used for such device becomes highly complicated in order to optimize power obtained. There are methods of control by, for example, continuously monitoring input voltage/current and output voltage/current, thereby making the output voltage/current follow target values, adopting MPPT (Maximum Power Point Tracking) control by way of a hill climbing method, etc.

This, however, causes problems that stability and reliability of operation is deteriorated as a power factor correction device conducting complicated controls is applied to an AC power generator in which output largely fluctuates. This means that it is desirable that a power factor correction device applied to an AC power generator using natural energy has a simple construction and control system.

Another problem is that a DC/DC convertor which is separately disposed on the output side of a boosting converter in a power factor correction device further complicates construction and control system and raises cost.

As a solution to the above-mentioned problems, it is an object of the present disclosure to provide a power factor correction device for three-phase AC-DC conversion which enables effective power factor correction and stable power conversion with a simple construction and control system as well as insulation between the input and output sides.

Devices for Solving the Problems

As a solution to the above-mentioned problems, the present disclosure has been accomplished, the details of which are described below. In the below description, the reference symbols in parentheses correspond to those shown in the drawings.

According to an aspect of the present disclosure, there is provided a power factor correction device comprising:
a power factor correction device comprising:
(a) first, second and third input terminals (R, S, T) to which three-phase AC is inputted;
(b) a positive electrode terminal (p) and a negative electrode terminal (n);
(c) first, second and third transformers (Tr, Ts, Tt) respectively having primary coils (Lr1, Ls1, Lt1) with one ends respectively connected to said first, second and third input terminals (R, S, T) and secondary coils (Lr2, Ls2, Lt2) with one ends respectively connected to said negative electrode terminal (n);
(d) one or more switching elements having control ends (G) on-off controlled so as to open/close the current path between the other ends of said primary coils (Lr1, Ls1, Lt1) of said first, second and third transformers (Tr, Ts, Tt) and a common potential terminal (e) on the side of said primary coils;
(e) first, second and third rectifying devices (D1, D2, D3) respectively disposed between the other ends of said secondary coils (Lr2, Ls2, Lt2) of said first, second and third transformers (Tr, Ts, Tt) and said positive electrode terminal (p) so as to pass current flow into said positive electrode terminal when the other ends of said secondary coils have forward-biased potentials and block current flow into said positive electrode terminal when the other ends of said secondary coils have reverse-biased potential;
(f) a smoothing condenser (C) disposed between said positive electrode terminal (p) and said negative electrode terminal; wherein
(g) the control ends of said one or more switching elements (G) are controlled by a single control signal having a constant duty ratio.

In the above power factor correction device, said one or more switching elements may comprise first, second and third switching elements (Q1, Q2, Q3) respectively disposed between the other ends of said primary coils (Lr1, Ls1, Lt1)

of said first, second and third transformers (Tr, Ts, Tt) and a common potential terminal (e) on the side of said primary coils.

In the above power factor correction device, said one or more switching elements may comprise a single switching element (Q) disposed between the other ends of said primary coils (Lr1, Ls1, Lt1) of said first, second and third transformers (Tr, Ts, Tt) and a common potential terminal (e) on the side of said primary coils.

The above power factor correction device may comprise fourth, fifth and sixth rectifying devices (D4, D5, D6) passing reflux current flow from said common potential terminal (e) into said first, second and third input terminals (R, S, T) by way of said primary coils (Lr1, Ls1, Lt1) of said first, second and third transformers (Tr, Ts, Tt).

The above power factor correction device may comprise fourth, fifth and sixth rectifying devices (D14, D15, D16) passing direct reflux current flow from said common potential terminal (e) into said first, second and third input terminals (R, S, T).

According to another aspect of the present disclosure, there is provided a power factor correction device comprising:

(a) first, second and third input terminals (R, S, T) to which three-phase AC is inputted;

(b) a positive electrode terminal (p) and a negative electrode terminal (n);

(c) first, second and third transformers (Tr, Ts, Tt) respectively having a primary coils (Lr1, Ls1, Lt1) with one ends respectively connected to said first, second and third input terminals (R, S, T), first secondary coils (Lr21, Ls21, Lt21) with other ends respectively connected to said negative electrode terminal (n) and second secondary coils (Lr22, Ls22, Lt22) with one ends respectively connected to said negative electrode terminal (n);

(d) one or more switching elements having control ends (G) on-off controlled so as to open/close the current path between the other ends of said primary coils (Lr1, Ls1, Lt1) of said first, second and third transformers (Tr, Ts, Tt) and a common potential terminal (e) on the side of said primary coils;

(e) first, second and third rectifying devices (D1, D2, D3) respectively disposed between the one ends of said first secondary coils (Lr21, Ls21, Lt21) of said first, second and third transformers (Tr, Ts, Tt) and said positive electrode terminal (p) so as to pass current flow into said positive electrode terminal when the one ends of said first secondary coils have forward-biased potentials and block current flow into said positive electrode terminal when the one ends of said first secondary coils have reverse-biased potentials;

(f) fourth, fifth and sixth rectifying devices (D1', D2', D3') respectively disposed between the other ends of said second secondary coils (Lr22, Ls22, Lt22) of said first, second and third transformers (Tr, Ts, Tt) and said positive electrode terminal (p) so as to pass current flow into said positive electrode terminal when the other ends of said second secondary coils have forward-biased potentials and block current flow into said positive electrode terminal when the other ends of said second secondary coils have reverse-biased potentials; and (g) a smoothing condenser (C) disposed between said positive electrode terminal (p) and said negative electrode terminal; wherein (h) the control ends of said one or more switching elements are controlled by a single control signal having a constant duty ratio.

In the above power factor correction device, said one or more switching elements comprise first, second and third switching elements (Q1, Q2, Q3) respectively disposed between the other ends of said primary coils (Lr1, Ls1, Lt1) of said first, second and third transformers (Tr, Ts, Tt) and a common potential terminal (e) on the side of said primary coils.

In the above power factor correction device, said one or more switching elements may comprise a single switching element (Q) disposed between the other ends of said primary coils (Lr1, Ls1, Lt1) of said first, second and third transformers (Tr, Ts, Tt) and a common potential terminal (e) on the side of said primary coils.

The above power factor correction device may comprise seventh, eighth and ninth rectifying devices (D4, D5, D6) passing reflux current flow from said common potential terminal (e) into said first, second and third input terminals (R, S, T) by way of said primary coils (Lr1, Ls1, Lt1) of said first, second and third transformers (Tr, Ts, Tt).

The above power factor correction device may comprise seventh, eighth and ninth rectifying devices (D14, D15, D16) passing direct reflux current flow from said common potential terminal (e) into said first, second and third input terminals (R, S, T).

In the above power factor correction device, said primary coils (Lr1, Ls1, Lt1) and said first secondary coils (Lr21, Ls21, Lt21) may be respectively loosely magnetically coupled, and said primary coils (Lr1, Ls1, Lt1) and said second secondary coils (Lr22, Ls22, Lt22) may be respectively tightly magnetically coupled.

The above power factor correction device may comprise a voltage detection element detecting input voltage of three-phase AC and an element determining a duty ratio corresponding to the detected input voltage and generating a control signal having the determined duty ratio.

In the above power factor correction device, the correspondence relation between said input voltage and said duty ratio may be preset.

Effects

As described in the above, the present disclosure provides a power factor correction device for three-phase AC-DC conversion which enables effective power factor correction and stable power conversion with a simple construction and control system as well as insulation of the input terminals and the output terminals.

BEST MODE

Figure 1:
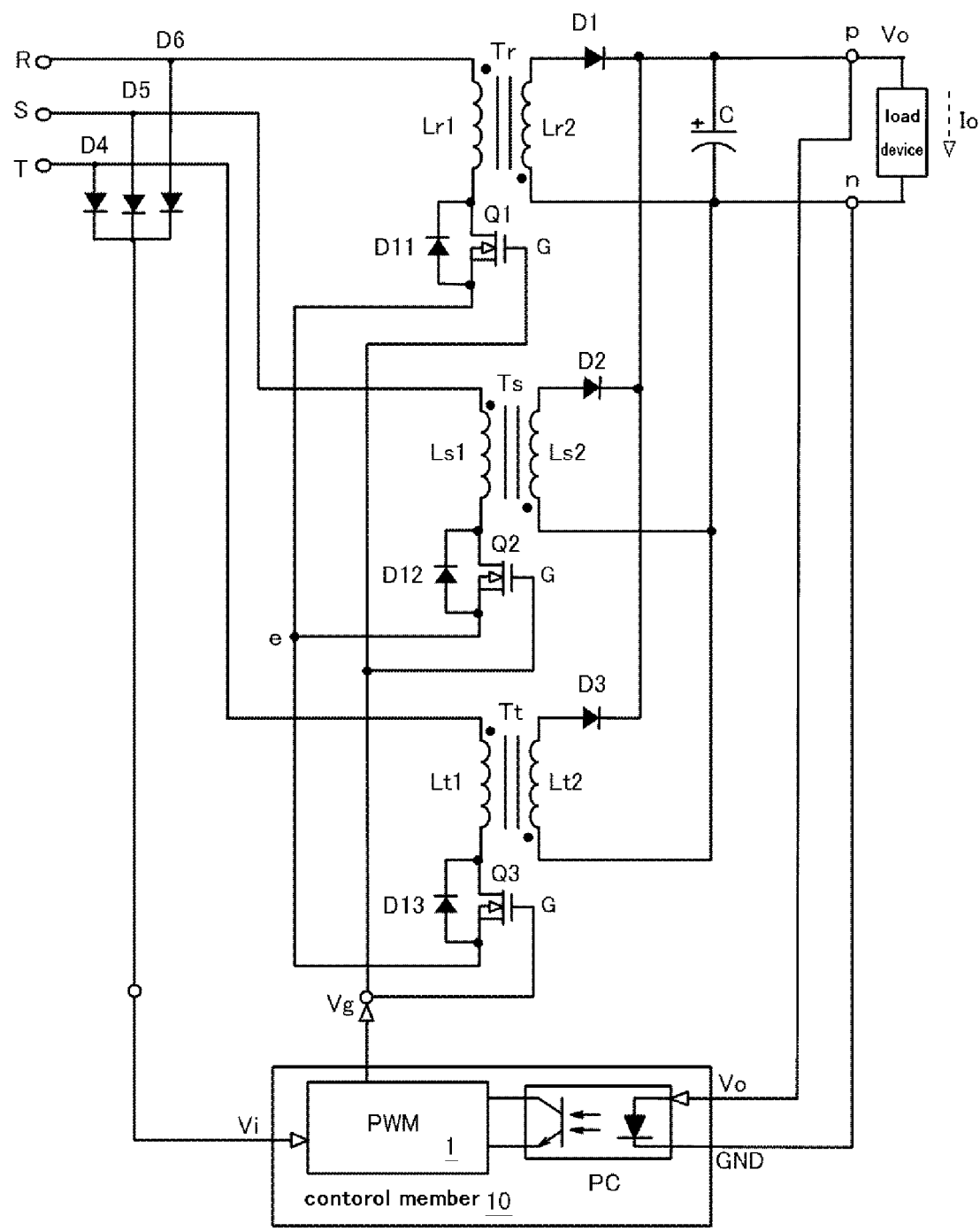
FIG. 1 is a view schematically showing a circuit configuration of a power factor correction device according to a first embodiment of the present disclosure.

Described hereinafter with reference to the attached drawings are detailed embodiments of power factor correction devices according to the present disclosure. Although below described as the best mode Ts are power factor correction devices to be inputted with three-phase AC, power factor correction devices of the present disclosure may also be inputted with single-phase AC or DC. In the figures, like reference numerals refer to like members which have similar basic composition and operation.

For example, AC power generators of wind power plants is equipped with three-phase stator coils Y-connected to rotors which are made of permanent magnet. The axes of the AC power generators are connected to those of windmills by way of gears. As the windmills and the rotors rotate, the three-phase stator coils output three-phase AC. The output voltage of the AC power generators is proportional to the rotating speed of the power generator.

Inputted with the current outputted from the AC power generators such as described in the above, the power factor correction devices according to the present disclosure output DC to a load device. The power factor correction devices can also be regarded as poser conversion devices converting three-phase AC into DC. The power factor correction devices aim to correct the power factor value into 1 by causing input current to have the same sine waveform and phase as the input voltage.

The power factor correction devices according to the present disclosure further have function to insulate the input terminals and the output terminals. The power factor correction devices according to the present disclosure are adapted to such load devices as various appliances, invertors (including grid-connected invertors), etc.

[1] FIRST EMBODIMENT

<Basic Configuration of First Embodiment>

FIG. 1 is a view schematically showing a circuit configuration of a power factor correction device according to a first embodiment of the present disclosure. The power factor correction device for three-phase AC-DC conversion according to the first embodiment has three transformers in correspondence to the three phases so as to insulate the input terminals and the output terminals. Each of these transformers is configured in a similar way as flyback convertors.

On the primary side, i.e. the side facing the input terminals, of the transformers are arranged a first input terminal R, a second input terminal S and a third input terminal T to which three-phase AC is inputted. Each phase of the three-phase AC is inputted into each of the three input terminals. The three phases of the three-phase AC are herein referred to as R phase, S phase and T phase. Each phase is shifted from the other phases by $2\pi/3$ (120 degrees).

On the secondary of the transformers are arranged a positive electrode terminal p and a negative electrode terminal n, from which DC is outputted. The output voltage Vo is applied to a load device which is connected to the positive electrode terminal p and the negative electrode terminal n, thereby the output current Io flows from the positive electrode terminal p to the negative electrode terminal n passing through the load device. Although the load device herein is assumed to be a resistive load just for ease of explanation, it is not limited to resistive load and may be other kinds of load.

The three transformers Tr, Ts, Tt each has a primary coil and a secondary coil, preferably of the same configuration, i.e. electromagnetic property. The reference symbols $Lr1$, $Ls1$, $Lt1$ each indicates the primary coil of each transformer. The reference symbols $Lr2$, $Ls2$, $Lt2$ each indicates the secondary coil of each transformer. In the figures, winding start ends of the coils are shown by the black dots (indicative of the polarity of the coils). The phrases "one end" and "other end" used herein, throughout in all the embodiments, may refer to a "winding start end" and a "winding end end" respectively, or a "winding end end" and a "winding start end" respectively.

The one ends (winding start ends) of the primary coils Lr1, Ls1, Lt1 of the transformers are respectively connected to the input terminals R, S, T. The other ends (winding end ends) of the primary coils Lr1, Ls1, Lt1 of the transformers are respectively connected to one ends of switching elements Q1, Q2, Q3. The other ends of switching elements Q1, Q2, Q3 are connected to a common potential terminal (e). The switching elements Q1, Q2, Q3 are respectively on-off controlled so as to open/close the current path between the other ends of the primary coils Lr1, Ls1, Lt1 and the common potential terminal e on the side of said primary coils.

The switching elements Q1, Q2, Q3 each further has a control end G to be on-off controlled by a common control signal Vg. The control signal Vg is a pulse wave with a predetermined frequency and duty ratio. This means that the three switching elements Q1, Q2, Q3 are synchronously on-off controlled. As exemplified in the figure, the switching elements Q1, Q2, Q3 are made of n-channel MOSFET (hereinafter also indicated by "FETs Q1, Q2, Q3") each having a drain end and a source in addition to the control end or gate G. In this configuration, the control signal Vg is a voltage signal. P-channel type MOSFETs may be used.

Rectifying devices D4, D5, D6 are arranged so as to return to the side of the input terminals the current flown into the common potential terminal e from the switching elements Q1, Q2, Q3. The rectifying devices D4, D5, D6 return the current from the common potential terminal on the side of the primary coils to the input terminals R, S, T by way of the primary coils Lr1, Ls1, Lt1 of the transformers.

Although rectifying devices D4, D5, D6 can be replaced by parasitic diodes of the FET Q1, Q2, Q3, it is preferable to arrange preferential current paths using separate rectifying elements having low forward voltage. In case the switching elements Q1, Q2, Q3 are not MOSFETs, but are IGBTs or bipolar transistors, for example, it is required to arrange separate rectifying elements. Separate rectifying elements need to be disposed in reversely parallel to the main current of the switching elements (in parallel to the parasitic diodes). The rectifying devices D4, D5, D6 are hereinafter referred to as "reflux diodes".

The other ends of the secondary coils Lr2, Ls2, Lt2 are respectively connected to one ends of rectifying devices D1, D2, D3, the other ends of which are connected to the positive electrode terminal p. The one ends of rectifying devices D1, D2, D3 are respectively applied with voltage of the other ends of the secondary coils Lr2, Ls2, Lt2. The rectifying devices D1, D2, D3 pass the current flow from the other ends of the secondary coils Lr2, Ls2, Lt2 into the positive electrode terminal p when the other ends of said secondary coils have forward bias potential and block the current flow when they have reverse bias potential.

The rectifying devices D1, D2, D3, which are basically equivalent to output diodes of flyback convertors, are hereafter referred to as "output diodes". Output diodes that have low forward voltage and operate at high speed are preferably used.

The one ends of the secondary coils Lr2, Ls2, Lt2 connected to negative electrode terminal n, which is a common potential terminal on the side of the secondary coils.

Further arranged between the positive electrode terminal p and the negative electrode terminal n is a smoothing condenser C.

Further arranged is a control member 1. The control member 1 at least has an element for detecting the three-phase AC input voltage Vi and preferably has an element for detecting the output voltage Vo for the purpose of feedback control. The control member 1 further has an element for generating a control signal Vg in correspondence to the detected voltages.

The element for detecting the AC input voltage Vi may determine the value of the input voltage Vi by, for example, obtaining current having been inputted from the input terminals R, S, T and rectified by the rectifying devices D7, D8, D9 and averaging the current. The input voltage Vi may be represented by the effective value, the maximum value or the average value (absolute value) of the three-phase AC input voltage as long as it works as a parameter for evaluating the amplitude of the input voltage.

The "rectifying devices" herein involves, in addition to diodes, rectifying circuit equivalent to diodes.

The element for detecting the output voltage Vo obtains the voltage between the positive electrode terminal p and the negative electrode terminal n. As the present disclosure aims to insulate the input terminals and the output terminals, it is preferable that the feedback signal of the output voltage Vo is inputted into the control member 1 after insulated by passing through a photo-coupler PC. The disposition of the photo-coupler PC is not limited to that shown in the figure, but it may be on any part of the path between the output terminals p, n and the control terminal G of the switching elements.

The element for generating a control signal Vg determines the duty ratio of the control signal Vg on the basis of the detected input voltage Vi, or of the detected input voltage Vi and output voltage Vo. Then, it generates a control signal Vg on the basis of the determined duty ratio. A PWM circuit or a PWM element is usually used. For example, it is possible to output a control signal Vg in the form of pulse wave having a constant duty ratio by inputting into a comparator a DC signal corresponding to the determined duty ratio and a triangle carrier signal having a constant frequency. In the present disclosure, such a control signal Vg is referred to as a control signal "having a constant duty ratio".

<Operation of First Embodiment>

Figure 2:
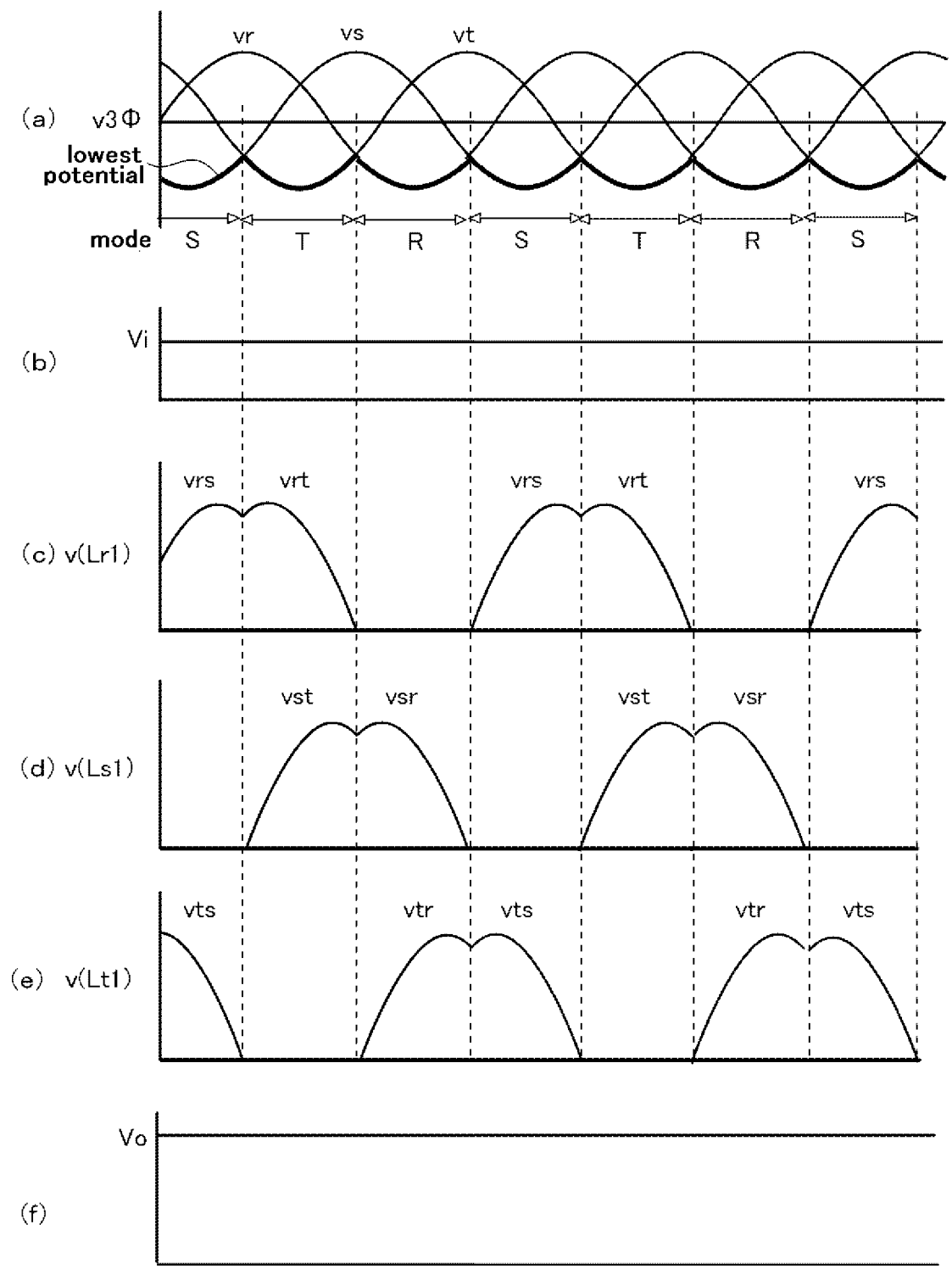
FIG. 2 is a view showing examples of operating waveforms representing the temporal changes of the current and voltage detected at several points of the circuit shown in FIG. 1.
Figure 3:
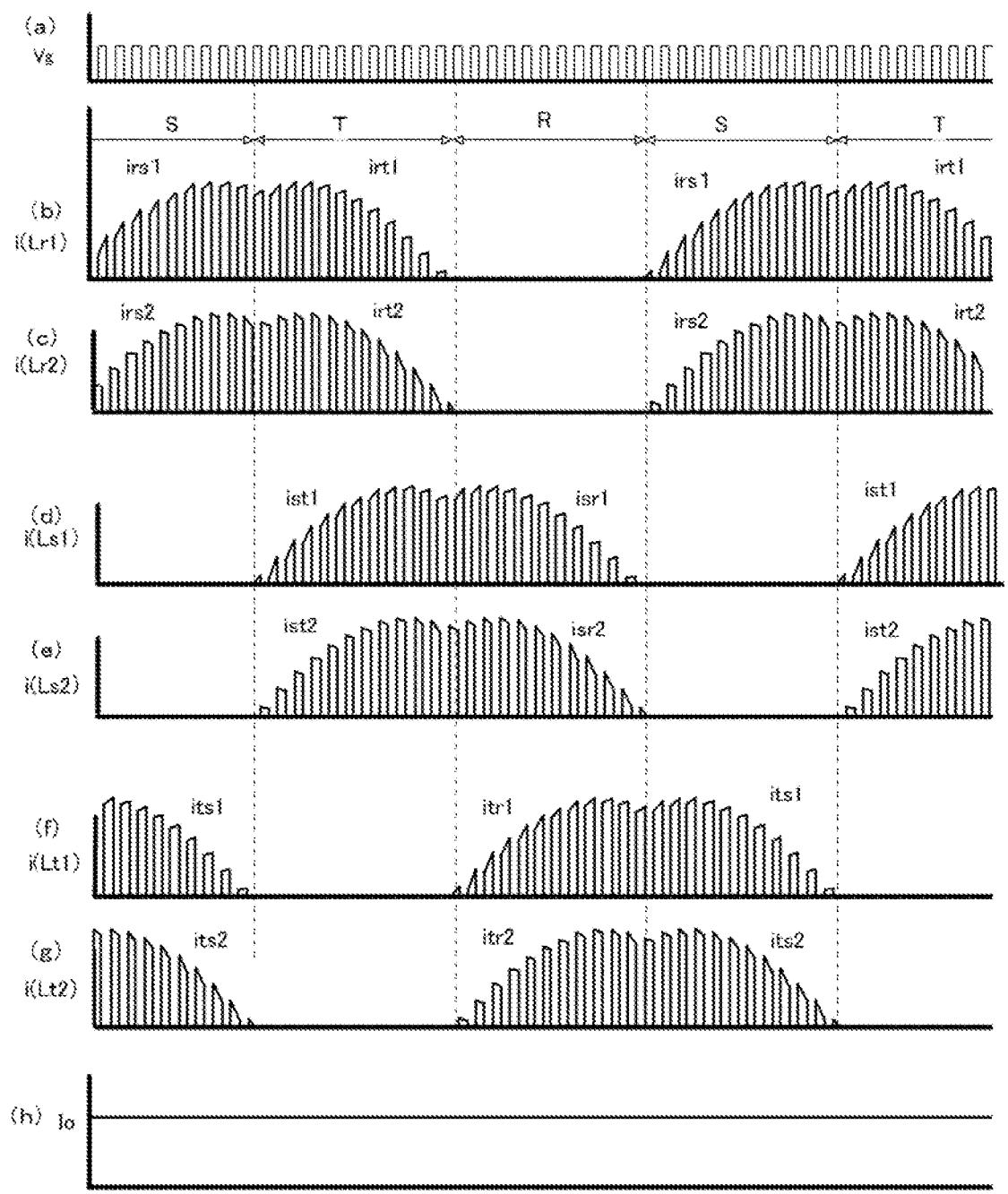
FIG. 3 is a view showing examples of operating waveforms representing the temporal changes of the current and voltage detected at several points of the circuit shown in FIG. 1.

FIG. 2 and FIG. 3 are views showing examples of operating waveforms representing the temporal changes of the current and voltage detected at several points of the circuit shown in FIG. 1.

FIG. 2(a) is a view showing the temporal change of the input voltage of each phase of the three-phase AC. The voltage of each phase is indicated by vr, vs, vt. The voltage of each phase is based on the reference potential on the neutral point (the center of the Y connection). Indicated by the thickened part of the waves is the trajectory of the lowest potential of the input terminals R, S, T. As shown in the figure, the phase that has the lowest potential changes for every 120 degree. "Mode R", "mode S", "mode T" is each defined as the mode in which each one of the three phases has the lowest potential. For example, in mode R, the first input terminal R has the lowest potential. In former half of mode R, the second input terminal S a higher potential than the third input terminal T. In the latter half of mode R, the third input terminal T a higher potential than the second input terminal S.

FIG. 2(b) is a view showing an example of the value of the input voltage Vi. It may be obtained, for example, by half-wave-rectifying and averaging the three-phase AC.

FIGS. 2(c), 2(d), 2(e) are views each showing the voltage v(Lr1), v(Ls1), v(Lt1) inputted into one end of the each of the primary coils Lr1, Ls1, Lt1 of the transformers. In the graph, the base potential line corresponds to the trajectory of the lowest potential shown in FIG. 2(a). This means that the voltage applied to one end of each primary coil becomes zero in the mode in which the corresponding input terminal has the lowest potential. In other modes, one end of each primary coil is applied with line voltage of the corresponding input terminal and the input terminal having the lowest potential.

As shown in FIGS. 2(c), 2(d), 2(e), in mode R, the voltage v(Lr1) of one end of the primary coil Lr1 of the transformer Tr is zero while the voltage v(Ls1) of one end of the primary coil Ls1 of the transformer Ts is the line voltage vsr of the second input terminal S and the first input terminal R, and the voltage v (Lt1) of one end of the primary coil Lt1 of the transformer Tt is the line voltage vts of the third input terminal T and the first input terminal R.

As shown in FIGS. 2(c), 2(d), 2(e), in mode S, the voltage v(Lr1) of one end of the primary coil Lr1 of the transformer Tr is the line voltage vrs of the first input terminal R and the second input terminal S while the voltage v(Ls1) of one end of the primary coil Ls1 of the transformer Ts is zero, and the voltage v (Lt1) of one end of the primary coil Lt1 of the transformer Tt is the line voltage vts of the third input terminal T and the second input terminal S.

As shown in FIGS. 2(c), 2(d), 2(e), in mode T, the voltage v(Lr1) of one end of the primary coil Lr1 of the transformer Tr is the line voltage vrt of the first input terminal R and the third input terminal T while the voltage v(Ls1) of one end of the primary coil Ls1 of the transformer Ts is the line voltage vst of the second input terminal S and the third input terminal T, and the voltage v(Lt1) of one end of the primary coil Lt1 of the transformer Tt is zero.

FIG. 2(f) is a view showing an example of the value of the output voltage Vo. The output is substantially direct current by the action of the smoothing condenser C (ripples ignored).

FIG. 3(a) shows the control signal Vg sent from the control member 1 to the gate G of each of the FET. The control signal Vg has a frequency of several kHz to several hundred kHz generated on the basis of the constant duty ratio having been determined by the control member 1. The frequency of the three-phase AC is substantially lower than that of the control signal Vg, e.g. ranging from several Hz to 100 Hz in case of AC power generators of wind power plants.

FIG. 3(b) and FIG. 3(c) respectively show the current waveforms of the primary coil Lr1 and the secondary coil Lr2 of the transformer Tr. FIG. 3(d) and FIG. 3(e) respectively show the current waveforms of the primary coil Ls1 and the secondary coil Ls2 of the transformer Ts. FIG. 3(f) and FIG. 3(g) respectively show the current waveforms of the primary coil Lt1 and the secondary coil Lt2 of the transformer Tt.

In FIG. 3, the graphs only show the input current on the side of the primary coils and the flyback current, or the main current induced by the above input current on the side of the secondary coils. The graphs show current flow in each of the transformers when the one ends of the primary coils are applied with potential higher than the lowest potential. The operation when the one ends of the primary coils are applied with the lowest potential will be described later with reference to FIGS. 4A, 4B, 4C.

In this embodiment, upon the control signal Vg is turned on, the FETs Q1, Q2, Q3 are turned on, excitation current flows in the primary coils Lr1, Ls1, Lt1 of the transformers according to the voltage applied thereto and magnetic energy is accumulated. On the other hand, there occurs no current flow in the secondary coils Lr2, Ls2, Lt2 as the output diodes are in a reverse biased state.

In this embodiment, upon the control signal Vg is turned off, the FETs Q1, Q2, Q3 are turned off and the current flow in the primary coils Lr1, Ls1, Lt1 of the transformers is interrupted while in the secondary coils Lr2, Ls2, Lt2 counter electromotive force is generated to change the output diodes into a forward biased state and, thus, flyback current is generated. The envelope of the waveform of the current flown in the secondary coils Lr2, Ls2, Lt2 forms a sine curve waveform having the same phase as the voltage waveform of the input terminals. Although only operation in current continuous mode is illustrated, the present disclosure is adaptable to operation in current discontinuous mode and in current critical mode. Thus, the power factor has got corrected to be 1.

FIG. 3(h) is a view showing an example of the value of the output current Io flown into a load device. The current flown in the secondary coils as shown in FIGS. 3(c), 3(e), 3(g) are added and outputted to the positive electrode terminal. The output current is substantially direct current by the action of the smoothing condenser C (ripples ignored).

Figure 4A:
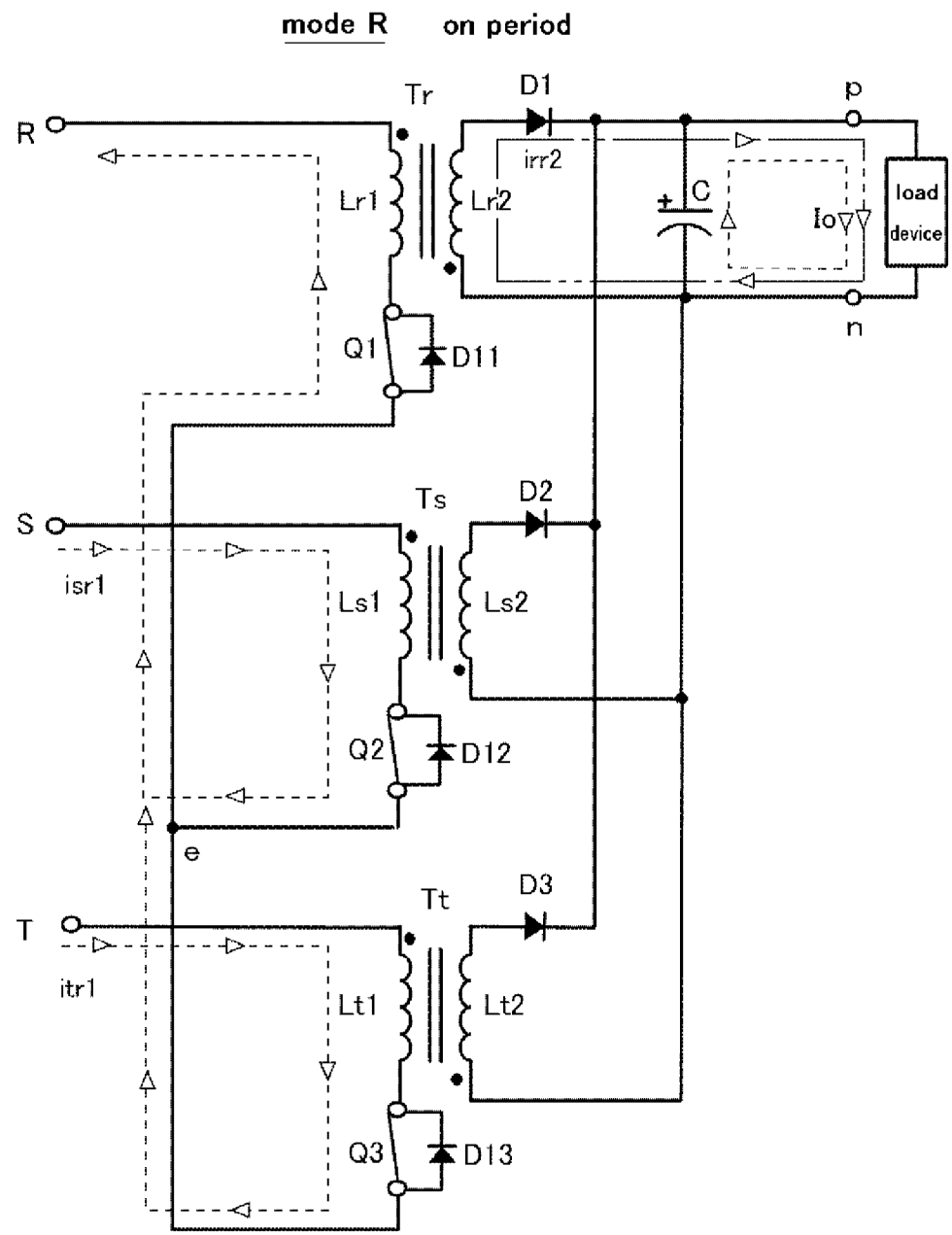
FIG. 4A is a view showing the current flow in an on period of mode R in the circuit configuration as shown in FIG. 1.
Figure 4B:
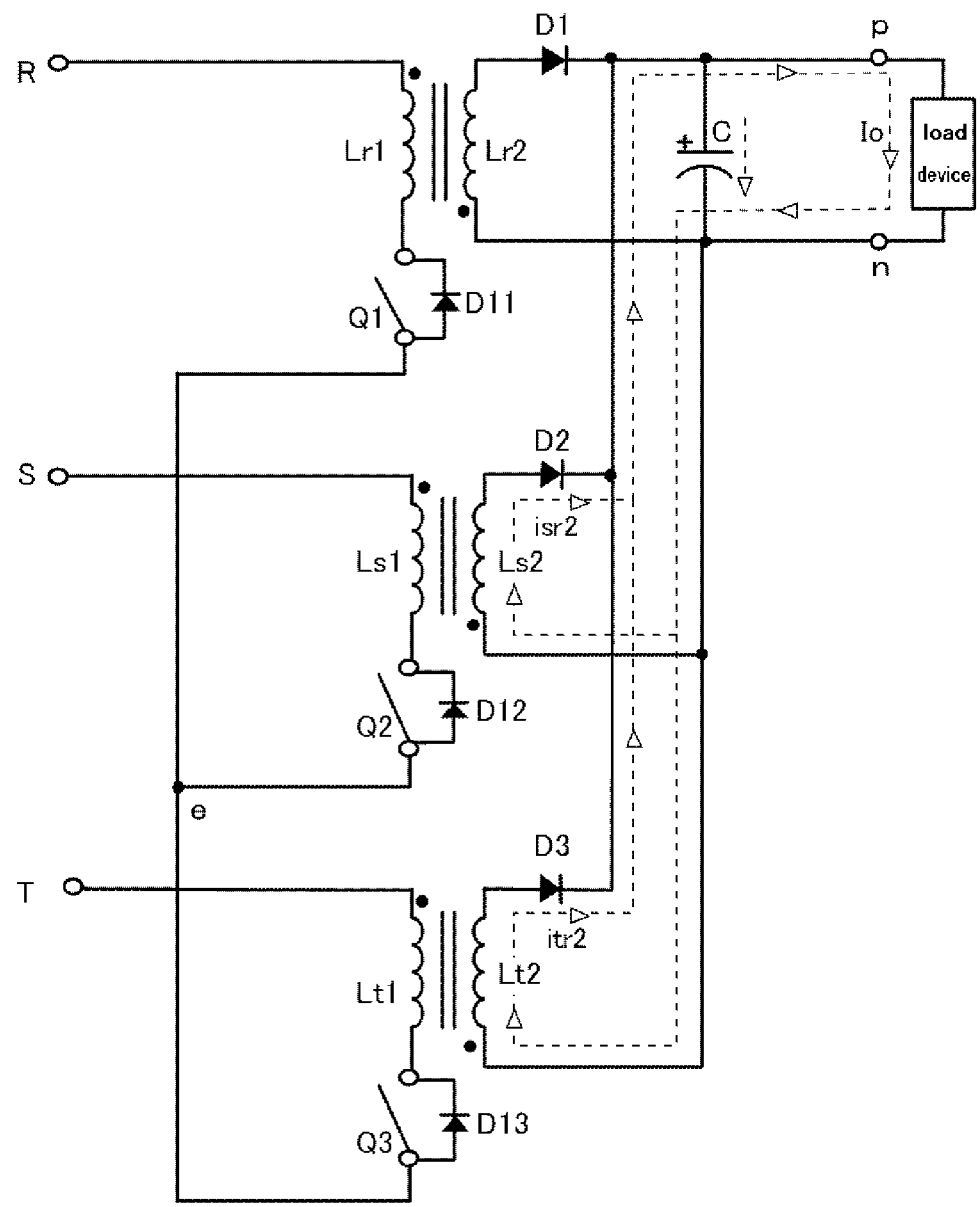
FIG. 4B is a view showing the current flow in an off period of mode R in the circuit configuration as shown in FIG. 1.
Figure 4C:
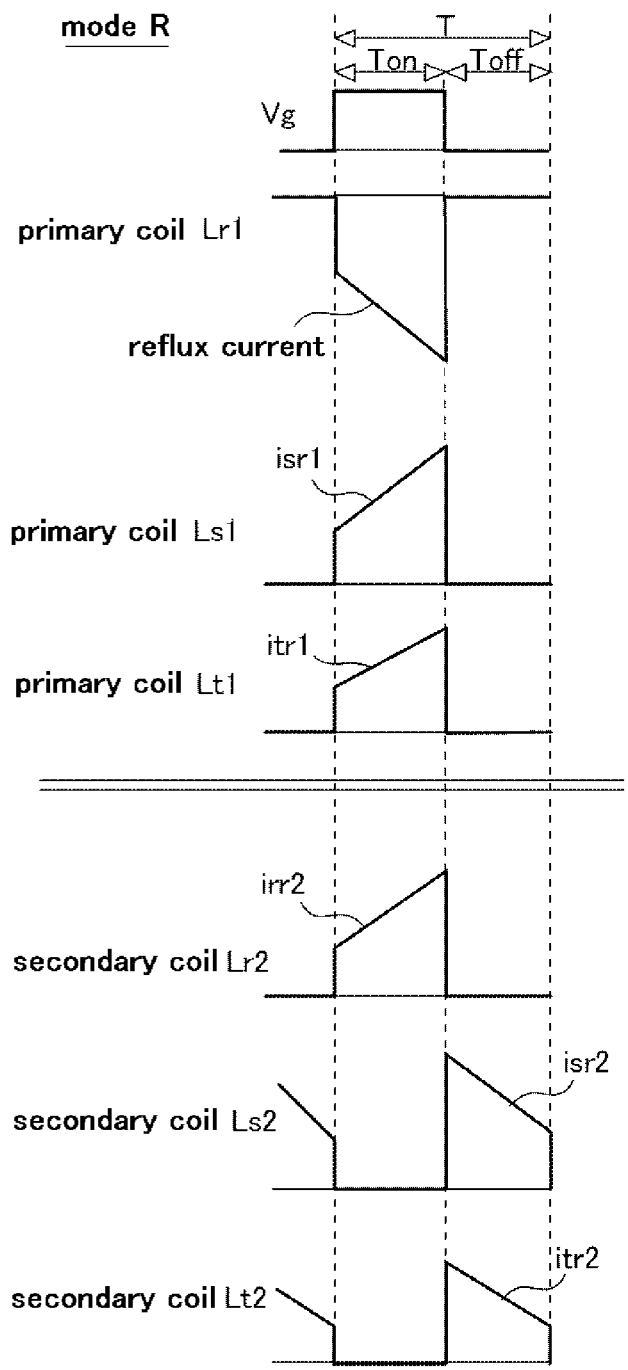
FIG. 4C is a view schematically showing examples of waveforms of the current flown at various points of the circuit shown in FIG. 4A and FIG. 4B.

Described in detail in the following, with reference to FIGS. 4A, 4B and 4C, is the operation of the power factor correction device having the circuit configuration as shown in FIG. 1. FIGS. 4A and 4B each shows the circuit configuration as shown in FIG. 1 with some part omitted. FIG. 4A shows an on period and FIG. 4B off period both in mode R (the first input terminal R has the lowest potential). FIG. 4C shows the waveforms of the current flown in the primary and secondary coils during a period of control signal Vg. As the operation in the mode S and mode T is similar to that in mode R, description regarding the mode S and mode T is omitted.

Operation During On Period

FIG. 4A shows the current flow in an on period of mode R. The dotted line arrows indicate the direction of the flow of the main current. The two-dotted line arrows indicate subsidiary current generated by reflux current.

Upon the control signal Vg is turned on, the FETQ1, FETQ2, FETQ3 are turned on and the switches are closed. The primary coil Ls1 of the transformer Ts is applied with line voltage vsr and input current isr1 flows therein. The input current isr1 flows from the second input terminal S to the primary coil Ls1, FETQ2, FETQ1 (or reflux diode D4), the primary coil Lr1 and the first input terminal R.

The primary coil Lt1 of the transformer Tt is applied with line voltage vtr and input current itr1 flows therein. The input current itr1 flows from the third input terminal T to the primary coil Lt1, FETQ3, FETQ1 (or reflux diode D4), the primary coil Lr1 and the first input terminal R.

The input current flown during the on period becomes excitation current such that the transformers Ts and Tt accumulate magnetic energy. During this period, the smoothing condenser C, having been at steady state and fully charged, supplies discharge current to the load device.

During the on period, reflux current (isr1+itr1) flows in the primary coil Lr1 of the transformer Tr. The reflux current has a direction opposite to the direction of the input current. The reflux current causes electromotive force to be generated in the secondary coil Lr2 so as to cause the output diode D1 to be forward biased with respect to the potential of the other end of the secondary coil Lr2. As a result, forward current irr2 flows in the secondary coil Lr2. Although the power factor correction device in this embodiment is basically a flyback converter, subsidiary current such as forward current also flows. The forward current of the secondary coils flows during the on period of the mode in which the one end of the corresponding primary coils have the lowest potential.

Operation During Off Period

FIG. 4B shows the current flow in an off period of mode R. The dotted line arrows indicate the direction of the flow of the main current. Upon the control signal Vg is turned off, the FETQ1, FETQ2, FETQ3 are turned off and the switches become open. The current paths of the primary coil Lr1, Ls1, Lt1 are interrupted and the current becomes zero. This causes counter electromotive force to be generated in the coils.

The counter electromotive force generated in the secondary coil Ls2 causes the output diode D2 to be forward biased with respect to the potential of the other end of the secondary coil Ls2 and flyback current isr2 to flow. It flows from the secondary coil Ls2 to the output diode D2, the load device (or the smoothing condenser C) and the secondary coil Ls2.

The counter electromotive force generated in the secondary coil Lt2 of the transformer Tt causes the output diode D3 to be forward biased with respect to the potential of the other end of the secondary coil Lt2 and flyback current itr2 to flow. It flows from the secondary coil Lt2 to the output diode D3, the load device (or the smoothing condenser C) and the secondary coil Lt2.

As the flyback current flows during the off period, the electromagnetic energy accumulated in the transformers Ts and Tt is discharged. The flyback current partly flows into the smoothing condenser C as a charging current.

As the counter electromotive force generated in the secondary coil Lr2 of the transformer Tr causes the output diode D1 to be reverse biased, current does not flow in the secondary coil Lr2.

Waveform of Control Signal

FIG. 4C shows the waveform of the control signal Vg during one period in mode R and the waveforms of current flowing in the primary coils Lr1, Ls1, Lt1 and the secondary coils Lr2, Ls2, Lt2 of the transformers. As the waveforms in the mode S and mode T is similar to those in mode R, description regarding the mode S and mode T is omitted. The duty ratio of the control signal Vg is given by the ratio of the time length of the on period Ton to the time length of one period T.

During the on period, the current isr1, itr1 of the primary coils Ls1, Lt1 of the transformers Ts, Tt increase with the lapse of time. During the off period, the current isr2, itr2 of the secondary coils Ls2, Lt2 decrease with the lapse of time.

By defining the average current value Isr1 of the current isr1 of the primary coil Ls1 during the one period, the instantaneous value (the value at the start of the period) Vsr of the line voltage vsr and the inductance L of the primary coil Ls1, the below formula is established.

$$Isr1 = Vsr/L\omega$$

($\omega$ as the frequency of the control signal Vg)

This formula teaches that the current flowing in the primary coils are a sine wave having a synchronous phase with the input voltage. This means that the current flowing in the secondary coils are also sine wave having a synchronous phase with the input voltage. Thus, the power factor has got corrected to be 1.

The major output current in the mode R is the flyback current during the off period of the transformers Ts, Tt, which is the sum of the current isr2 and itr2 flowing in the secondary coils Ls2 and Lt2.

The output current in mode R is also obtained from the forward current during the on period of the transformer Tr, which is the current irr2 flowing in the secondary coil Lr2. Thus, in this embodiment, it is possible to obtain the output current both during the on period and off period.

[2] SECOND EMBODIMENT

Figure 5:
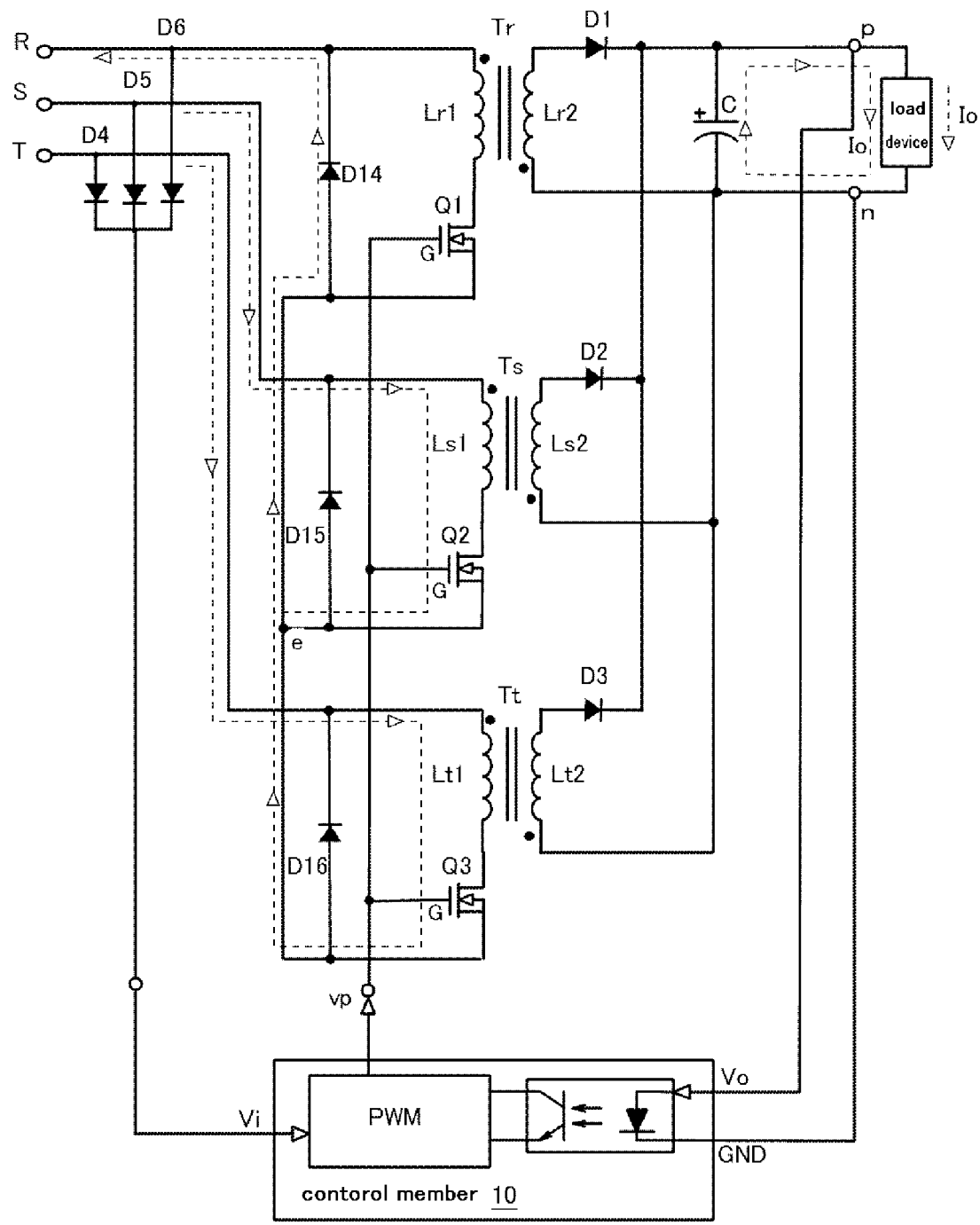
FIG. 5 is a view schematically showing a circuit configuration of a power factor correction device according to a second embodiment of the present disclosure.

FIG. 5 is a view schematically showing a circuit configuration of a power factor correction device according to a second embodiment of the present disclosure.

In the second embodiment, reflux diodes D14, D15, D16 are used in place of the reflux diodes D4, D5, D6 in the first embodiment. The reflux diodes D14, D15, D16 each has an anode connected to the common potential terminal e on the side of the primary coils and a cathode connected to one end of each of the primary coils Lr1, Ls1, Lt1 of the transformers, in other words, to each of the input terminals R, S, T.

In FIG. 5, the dotted line arrows indicate the direction of the flow of current during the on period of mode R. In the second embodiment, the reflux current on the side of the primary coils directly flows into the input terminals R, S, T by way of the reflux diodes D14, D15, D16 without passing through the primary coils Lr1, Ls1, Lt1, and then returns to the three-phase AC power source. This causes the current flown into the primary coils Lr1, Ls1, Lt1 to decrease such that magnetic saturation hardly occurs.

In the second embodiment, since reflux current does not flow in the primary coils Lr1, Ls1, Lt1 during the on period, forward current is not obtained during the on period unlike the first embodiment.

[3] THIRD EMBODIMENT

Figure 6:
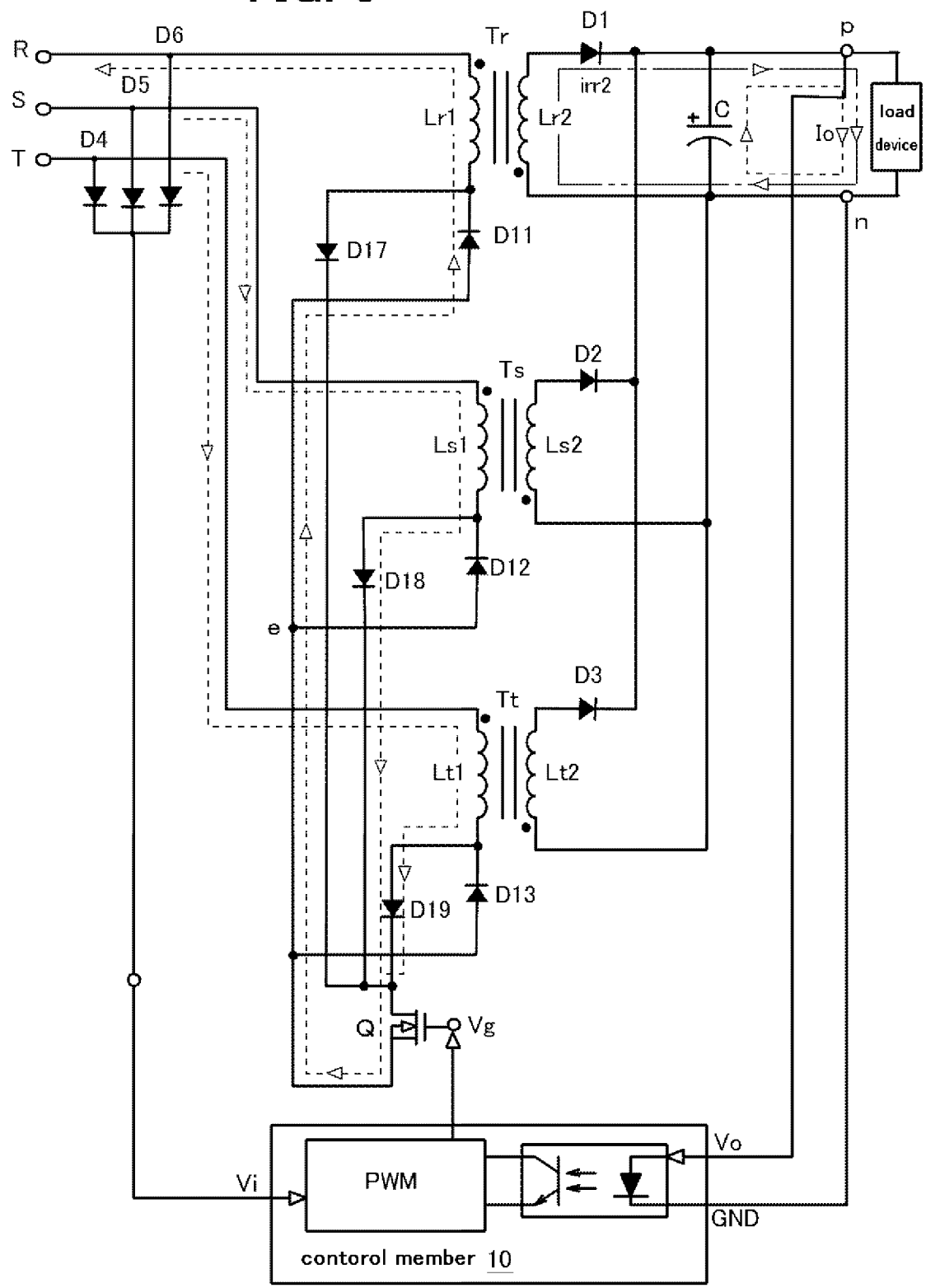
FIG. 6 is a view schematically showing a circuit configuration of a power factor correction device according to a third embodiment of the present disclosure.

FIG. 6 is a view schematically showing a circuit configuration of a power factor correction device according to a third embodiment of the present disclosure.

In the third embodiment, a switching element Q replaces the switching elements Q1, Q2, Q3 in the first embodiment. As switching control of boosting converters each corresponding to the three phases of the three-phase AC input is conducted by a common control signal, the switching elements can be put together as one. This reduces the cost for the switching elements. Although an n-channel MOSFET (hereinafter referred to as "FETQ") is illustrated in the figure, a p-channel MOSFET or other kinds of switching elements may be used.

To the other ends of the primary coils Lr1, Ls1, Lt1 of the transformers respectively are connected the anodes of three diodes D17, D18, D19. The cathodes are connected to the drain end of the FETQ. The diodes D17, D18, D19 are arranged in the forward direction with respect to the input current during the on period. The source end of the FETQ is connected to the common potential terminal e. The reflux diodes D4, D5, D6 have anodes connected to the common potential terminal e and cathodes connected respectively to the other ends of the primary coils Lr1, Ls1, Lt1 in the same way as the first embodiment.

In FIG. 6, the dotted line arrows indicate the direction of the flow of current during the on period of mode R. In the third embodiment, the input current on the side of the primary coils flows from the other ends of the primary coils Lr1, Ls1, Lt1 to the FETQ by way of the diodes D17, D18, D19. In the third embodiment, since the FETQ is shared by the three primary coils, it is necessary to arrange the reflux diodes D4, D5, D6 corresponding to the three phases despite the switching element being a MOSFET.

In the third embodiment, since flux current flows from the flux diode D4 to the primary coil Lr1 during the on period, it causes forward current irr2 to flow in the secondary coil Lr2, which is outputted through the diode D1 in the same way as the first embodiment.

[4] FOURTH EMBODIMENT

Figure 7:
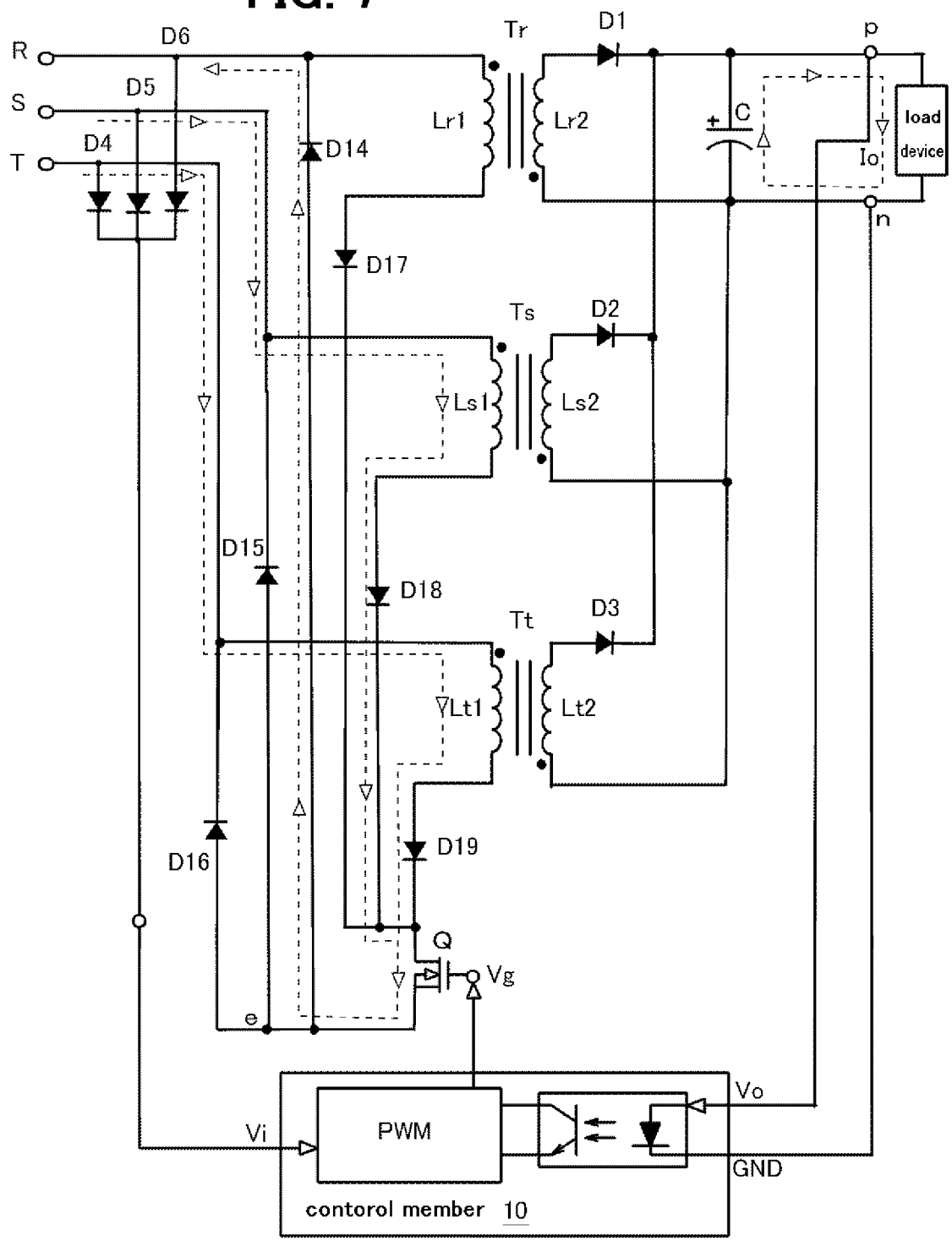
FIG. 7 is a view schematically showing a circuit configuration of a power factor correction device according to a fourth embodiment of the present disclosure.

FIG. 7 is a view schematically showing a circuit configuration of a power factor correction device according to a fourth embodiment of the present disclosure.

In the fourth embodiment, a switching element Q conducts switching control of boosting converters in the same way as the third embodiment and reflux diodes D14, D15, D16 are adopted in the same way as the second embodiment.

In the fourth embodiment, the cost for the switching elements is reduced. Furthermore, the reflux current on the side of the primary coils directly flows into the input terminals R, S, T by way of the reflux diodes D14, D15, D16 without passing through the primary coils Lr1, Ls1, Lt1, and then returns to the three-phase AC power source. This causes the current flown into the primary coils Lr1, Ls1, Lt1 to decrease such that magnetic saturation hardly occurs.

In FIG. 7, the dotted line arrows indicate the direction of the flow of current during the on period of mode R. In the fourth embodiment, since reflux current does not flow in the primary coils Lr1, Ls1, Lt1 during the on period, forward current is not obtained during the on period unlike the first embodiment.

[5] FIFTH EMBODIMENT

<Basic Configuration of Fifth Embodiment>

Figure 8:
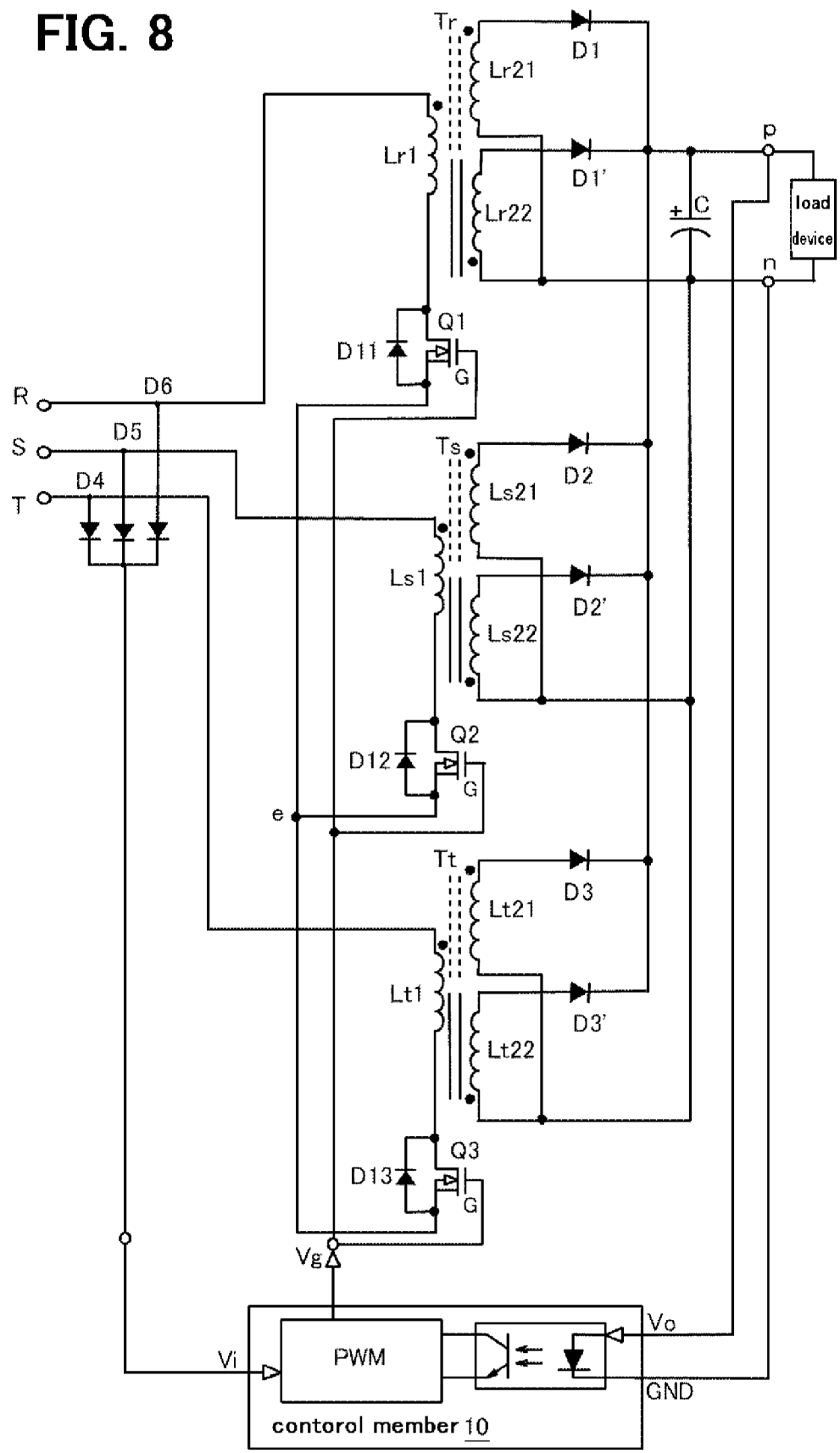
FIG. 8 is a view schematically showing a circuit configuration of a power factor correction device according to a fifth embodiment of the present disclosure.

FIG. 8 is a view schematically showing a circuit configuration of a power factor correction device according to a fifth embodiment of the present disclosure.

The power factor correction device for three-phase AC-DC conversion according to the fifth embodiment of the present disclosure has three transformers corresponding to the three phases of AC input each functions as both a forward converter and a flyback converter. In the fifth embodiment, each transformer has a primary coil L1, a first secondary coil L21 and a second secondary coil L22.

As shown in FIG. 8, the primary coils L1 are indicated by the reference symbols Lr1, Ls1, Lt1, the first secondary coils L21 are indicated by the reference symbols Lr21, Ls21, Lt21 and the second secondary coils L22 are indicated by the reference symbols Lr22, Ls22, Lt22.

It is preferable that each primary coil L1 and each first secondary coil L21 are magnetically loosely coupled to each other, and each primary coil L1 and each second secondary coil L22 are magnetically tightly coupled to each other. In "loose" magnetic coupling, the coupling coefficient of the two coils wound on the transformers is less than 1, which means that not all the magnetic flux from the primary coils L1 pass through the secondary coils L21 and part of the magnetic flux from the primary coils L1 is leaked. As a result, the mutual induction voltage ratio is determined not only on the basis of the winding number ratio. Two coils are made to be magnetically loosely coupled to each other by arranging a gap in the core of the transformer or winding the primary coil and the secondary coil at a distant position from each other. In "tight" magnetic coupling, the coupling coefficient of the two coils wound on the transformers is 1. In order to make two coils magnetically tightly coupled to each other, leakage of magnetic flux needs to be prevented by, for example, overwrapping.

As the configuration of the transformers Tr, Ts, Tt on the side of the primary coils is similar to those in the first embodiment, description thereof is omitted. The transformers Tr, Ts, Tt on the side of the primary coils may be configured in the same way as the second, third or fourth embodiments.

Blow described is the configuration of the transformers Tr, Ts, Tt on the side of the secondary coils. Between the one end (winding start end) of each of the first secondary coils L21 and positive electrode terminal p is arranged an output diode D1. The anode of the output diode D1 is connected to the one end of each of the first secondary coils L21 and the cathode to the positive electrode terminal p.

Between the one end (winding start end) of each of the second secondary coils L22 and positive electrode terminal p is arranged an output diode D1'. The anode of the output diode D1' is connected to the one end of each of the second secondary coils L22 and the cathode to the negative electrode terminal n.

The output diodes D1 and D1' become conductive when applied with forward biased voltage and interrupted when applied with reverse biased voltage. Between the positive electrode terminal p and the negative electrode terminal n is arranged a smoothing condenser C and a load device.

<Operation of First Embodiment>

Figure 9A:
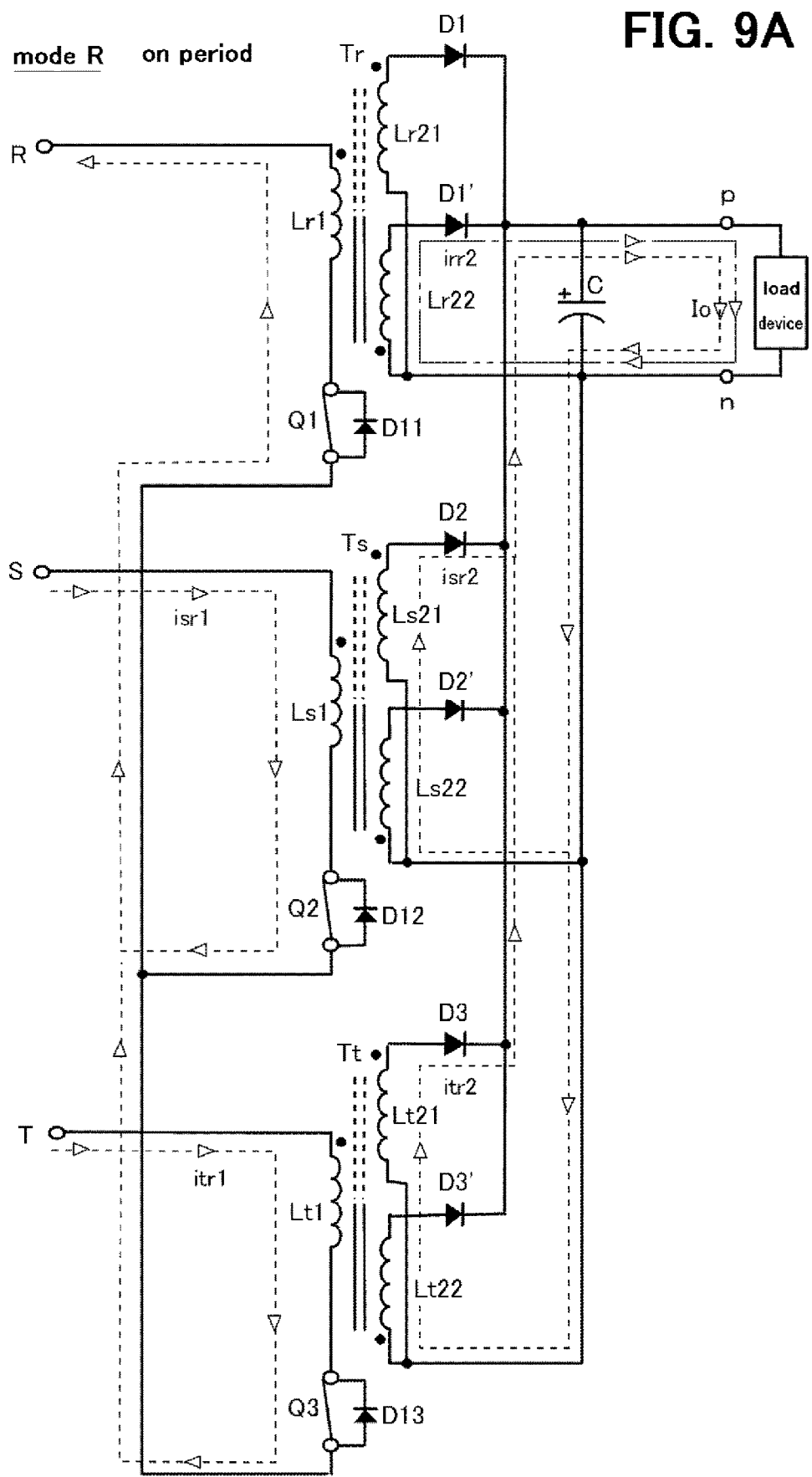
FIG. 9A is a view showing the current flow in an on period of mode R in the circuit configuration as shown in FIG. 8.
Figure 9B:
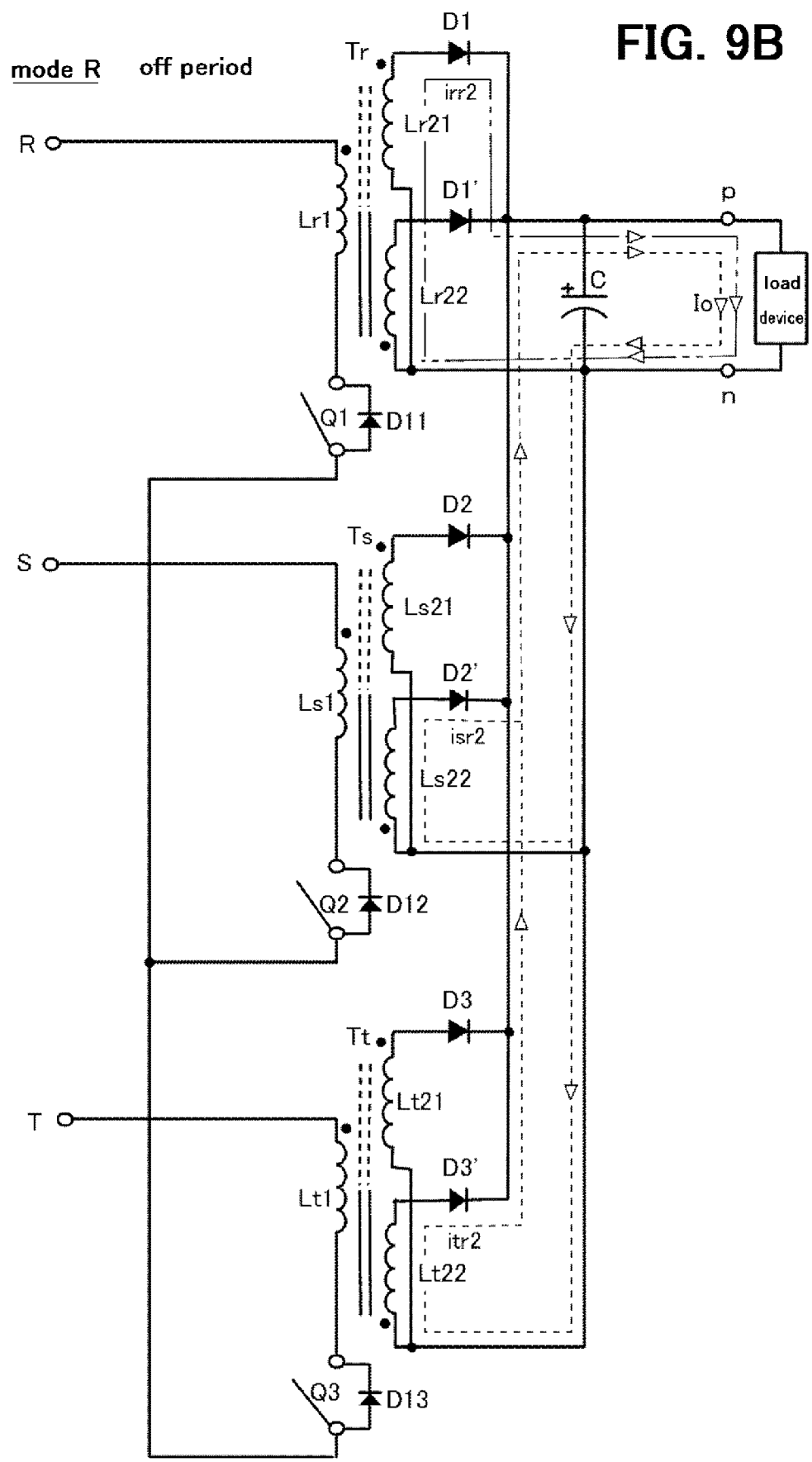
FIG. 9B is a view showing the current flow in an off period of mode R in the circuit configuration as shown in FIG. 8.
Figure 9C:
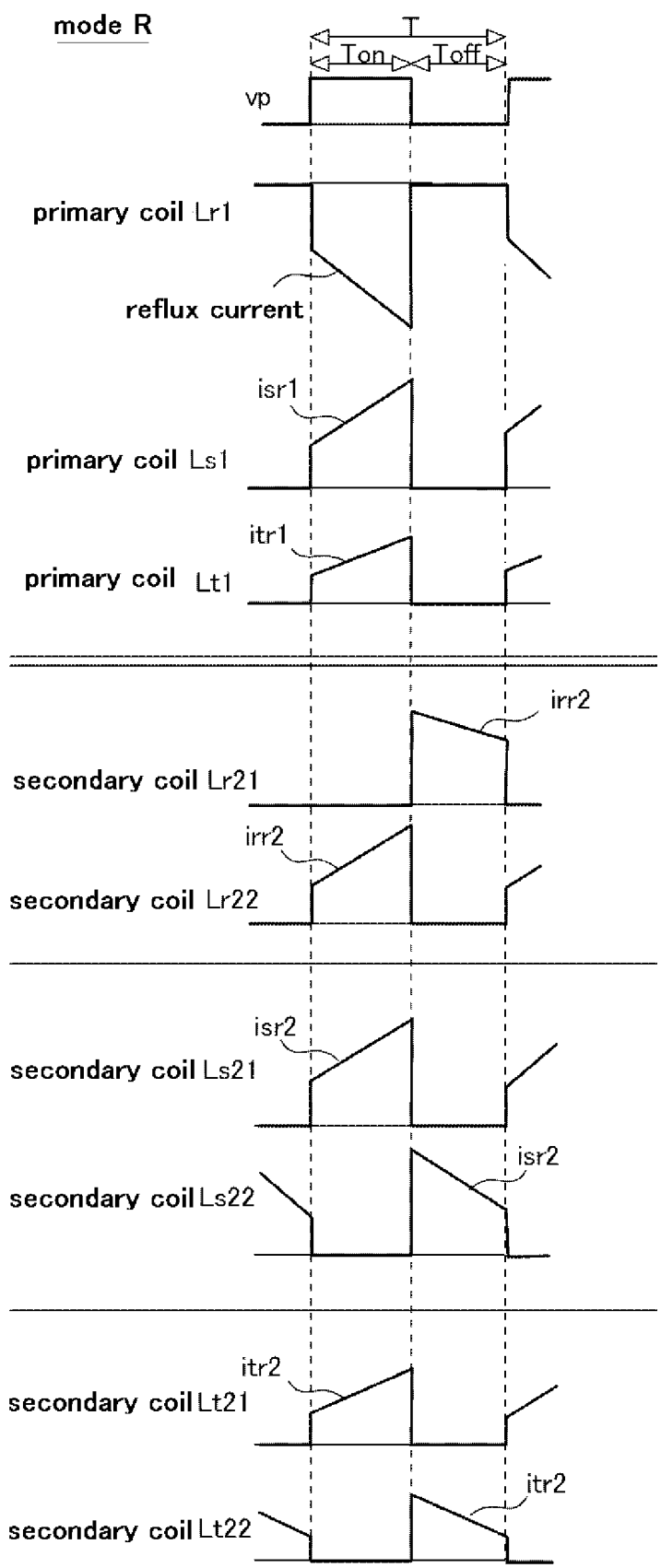
FIG. 9C is a view schematically showing examples of waveforms of the current flown at various points of the circuit shown in FIG. 9A and FIG. 9B.

With reference to FIGS. 9A, 9B and 9C, the operation of the power factor correction device configured as shown in FIG. 8 is described. FIGS. 9A and 9B each shows the circuit configuration as shown in FIG. 8 with some part omitted. FIG. 9A shows an on period and FIG. 8B off period both in mode R (the first input terminal R has the lowest potential). FIG. 9C shows the waveforms of the current flown in the primary and secondary coils during a period of control signal. As the operation in the mode S and mode T is similar to that in mode R, description regarding the mode S and mode T is omitted. Charging and discharging current of the smoothing C is not illustrated nor described.

Operation During On Period

FIG. 9A shows the current flow in an on period of mode R. The dotted line arrows indicate the direction of the flow of the main current. The two-dotted line arrows indicate subsidiary current generated by reflux current.

Upon the control signal Vg is turned on, the FETQ1, FETQ2, FETQ3 are turned on and the switches are closed.

The primary coil Ls1 of the transformer Ts is applied with line voltage vsr and input current isr1 flows therein. The input current isr1 flows from the second input terminal S to the primary coil Ls1, FETQ2, FETQ1 (or reflux diode D4), the primary coil Lr1 and the first input terminal R.

The input current isr1 flowing in the primary coil Ls1 of the transistor Ts causes electromotive force to be generated in the first secondary coil Ls21 so as to cause the output diode D2 to be forward biased with respect to the potential of the one end of the first secondary coil Ls21. As a result, forward current isr2 flows in the first secondary coil Ls21. The forward current isr2 flows from the first secondary coil Ls21 to the output diode D2, the load device and the first secondary coil Ls21. On the other hand, the electromotive force generated in the second secondary coil Ls22, which is forward biased with respect to the output diode D2', does not flow into the output diode D2'. During the on period, excitation current involved in the input current isr1 causes the transistor Ts to accumulate magnetic energy.

The primary coil Lt1 of the transformer Tt is applied with line voltage vtr and input current itr1 flows therein. The input current itr1 flows from the third input terminal T to the primary coil Lt1, FETQ3, FETQ1 (or reflux diode D4), the primary coil Lr1 and the first input terminal R.

The input current itr1 flowing in the primary coil Lt1 of the transistor Tt causes electromotive force to be generated in the first secondary coil Lt21 so as to cause the output diode D3 to be forward biased with respect to the potential of the one end of the first secondary coil Lt21. As a result, forward current itr2 flows in the first secondary coil Lt21. The forward current itr2 flows from the first secondary coil Lt21 to the output diode D3, the load device and the first secondary coil Lt21. On the other hand, the electromotive force generated in the second secondary coil Lt22, which is forward biased with respect to the output diode D3', does not cause the output diode D3' to be conductive. During the on period, excitation current involved in the input current itr1 causes the transistor Tt to accumulate magnetic energy.

During the on period, reflux current (isr1+itr1) flows in the primary coil Lr1 of the transformer Tr. The reflux current has a direction opposite to the direction of the input current. The reflux current causes electromotive force to be generated in the second secondary coil Lr22 so as to cause the output diode D1' to be forward biased. As a result, subsidiary forward current irr2 flows in the second secondary coil Lr22. The forward current irr2 flows from the second secondary coil Lr22 to the output diode D1', the load device and the second secondary coil Lr22. On the other hand, the electromotive force generated in the first secondary coil Lr21, which is reverse biased with respect to the output diode D1, does not cause the output diode D1 to be conductive. During the on period, excitation current involved in the reflux current causes the transistor Tr to accumulate magnetic energy.

In the power factor correction device in this embodiment, the input current flowing in two of the transformers and the reflux current flowing in one of the transformers respectively cause current flows in the secondary coils. The input current flowing in two of the transformers causes forward current to be outputted from the first secondary coils while the reflux current flowing in one of the transformers causes forward current to be outputted from the second secondary coils.

Operation During On Period

FIG. 9B shows the current flow in an off period of mode R. The dotted line arrows indicate the direction of the flow of the main current. The two-dotted line arrows indicate subsidiary current.

Upon the control signal Vg is turned off, the FETQ1, FETQ2, FETQ3 are turned off and the switches become open. The current paths of the primary coil Lr1, Ls1, Lt1 are interrupted and the current becomes zero. This causes counter electromotive force to be generated in the coils.

The counter electromotive force generated in the second secondary coil Ls22 causes the output diode D2' to be forward biased and flyback current isr2 to flow. The flyback current isr2 flows from the second secondary coil Ls22 to the output diode D2', the load device (or the smoothing condenser C) and the second secondary coil Ls22. On the other hand, the counter electromotive force generated in the first secondary coil Ls21, which is reverse biased with respect to the output diode D2, does not cause the output diode D2 to be conductive. The flyback current isr2 flowing during the off period causes the transformer Ts to discharge the accumulated magnetic energy.

The counter electromotive force generated in the second secondary coil Lt22 of the transformer Tt causes the output diode D3' to be forward biased and flyback current isr2 to flow. The flyback current isr2 flows from the second secondary coil Lt22 to the output diode D3', the load device (or the smoothing condenser C) and the second secondary coil Lt22. On the other hand, the counter electromotive force generated in the first secondary coil Lt21, which is reverse biased with respect to the output diode D3, does not cause the output diode D3 to be conductive. The flyback current itr2 flowing during the off period causes the transformer Tt to discharge the accumulated magnetic energy.

The counter electromotive force generated in the first secondary coil Lr21 causes the output diode D1 to be forward biased and flyback current irr2 to flow. The flyback current irr2 flows from the first secondary coil Lt21 to the output diode D1, the load device and the first secondary coil Lt21. On the other hand, the counter electromotive force generated in the second secondary coil Lr22, which is reverse biased with respect to the output diode D1', does not cause the output diode D1' to be conductive. The flyback current irr2 flowing during the off period causes the transformer Tr to discharge the accumulated magnetic energy.

In the power factor correction device according to this embodiment, flyback current flows in each of the secondary coils of the transformers during the off period. During the off period, the flyback current is outputted from each of the secondary coils which do not output the flyback current during the on period.

The subsidiary forward current and flyback current obtained from the transformer Tr in mode R results from the reflux current flowing in the primary coils of the transformer Tr. Accordingly, the primary coils of the transformers configured as in the second and fourth embodiments do not cause the secondary coils to output subsidiary current as the reflux current does not flow in the primary coils.

Waveform of Control Signal

FIG. 9C shows the waveform of the control signal Vg during one period in mode R and the waveforms of current flowing in the primary coils Lr1, Ls1, Lt1 and the secondary coils Lr21, Ls21, Lt21 and Lr22, Ls22, Lt22 of the transformers. The duty ratio of the control signal Vg is given by the ratio of the time length of the on period Ton to the time length of one period T.

During the on period, the current isr1, itr1 of the primary coils Ls1, Lt1 of the transformers Ts, Tt increase with the lapse of time.

During the off period, the current irr2 of the secondary coil Lr21 and the current isr2, itr2 of the secondary coils Ls22, Lt22 decrease with the lapse of time.

By defining the average current value Isr1 of the current isr1 of the primary coil Ls1 during the one period, the instantaneous value (the value at the start of the period) Vsr of the line voltage vsr and the inductance L of the primary coil Ls1, the below formula is established.

$$Isr1 = Vsr/L\omega$$

($\omega$ as the frequency of the control signal Vg)

This formula teaches that the current flowing in the primary coils are a sine wave having a synchronous phase with the input voltage. This means that the current flowing in the secondary coils are also sine wave having a synchronous phase with the input voltage. Thus, the power factor has got corrected to be 1.

As shown in FIGS. 9A, 9B and 9C, each of the transformers outputs forward current during the on period of mode R and flyback current during the off period of mode R. The same applies to mode S and mode T.

[6] METHOD OF CONTROL OF POWER FACTOR CORRECTION DEVICE

The power factor correction device according to the present disclosure is characterized in that switching control of boosting converters is conducted by a single control signal having a constant duty ratio with respect to the input voltage of each phases of the three-phase AC. This means that all the phases are on-off controlled at the same timing and the on period and the off period are constant. Accordingly, the control member only has to determine the duty ratio.

In the conventional boosting converters used in power factor correction device for three-phase AC-DC conversion, it has been common to vary the duty ratio of control signals using PWM modulation or to switch control respective phases at different timings. The method of control according to the present disclosure is remarkably simpler than these conventional methods.

The method of determining the duty ratio is not fixed to one method but may be selected from various methods according to the purposes. The parameters detected and used for determining the duty ratio may be the input voltage Vi only. In other example, the output voltage Vo in addition to the input voltage Vi are detected. The power factor correction device according to the present disclosure is capable of conduction various kinds of control based on the detected one or two parameters.

[7] SIXTH EMBODIMENT

The sixth embodiment of the present disclosure relates to a duty ratio controller for controlling the duty ratio of the control signal, i.e. the output signal from a PWM control IC used in the above-described power factor correction device.

The control member of the switching elements of the power factor correction device is usually made of a PWM control IC. In the power factor correction device, the output voltage Vo is proportional to the input voltage (the output voltage of generator) vi as shown in the below formula. The proportion coefficient M (D) is a function having a duty ratio D of a control signal vp as a variable.

$$Vo = M(D) \cdot vi \quad \text{(Formula 1)}$$

PWM control ICs are well-known devices and various types of PWM control ICs are commercially available. A PWM control IC is usually configured to have a cs terminal inputted with duty ratio control voltage Vcs, an out terminal to output a PWM control signal having a predetermined duty ratio and an terminal fb conducting feedback control for the purpose of stabilizing the output voltage Vo outputted from the power factor correction device. A PWM control IC is configured such that the duty ratio D of the control signal vp is proportional to the duty ratio control voltage Vcs as shown in the below formula.

$$D = A \cdot Vcs (A \text{ as a predetermined coefficient}) \quad \text{(Formula 2)}$$

Usually arranges is a separate controller for generating the duty ratio control voltage Vcs to be inputted into the PWM control IC (hereinafter referred to as "duty ratio controller"). The duty ratio controller detects the output voltage of generator vi, determines a optimum duty ratio on the basis of its amplitude and outputs to the PWM control IC duty ratio control voltage Vcs corresponding to the determined duty ratio. Accordingly, the duty ratio controller generates duty ratio control voltage Vcs represented by a function f having the output voltage of generator vi as a variable as shown in the below formula.

$$Vcs = f(vi) \quad \text{(Formula 3)}$$

The function f is used herein to indicate the one-to-one correspondence between the vi and Vcs.

In case of power generators of wind power plants, it is only after the output voltage of generator reaches a cut-in voltage that it starts to extracts electric power, in other words gets its power factor correction device to operate. Accordingly, the duty ratio controller also has a function to discriminate the cut-in voltage.

In an AC power generator using natural energy such as wind power, in particular, the output largely fluctuates. Accordingly, switch control of a power factor correction device becomes highly complicated in order to optimize the power obtained. In order to embody the above function f in the formula Vcs=f(vi) in the duty ratio controller, it is common to employ a method of determining a duty ratio by detecting input/output power of the power factor correction device and conducting MPPT (Maximum Power Point Tracking) control by way of a hill climbing method, or a method of determining a duty ratio by on the basis of a pre-stored correlation tables of the output voltage of generator vi and the output voltage Vo outputted from the power factor correction device.

Duty ratio controller configured as in the above, however, is liable to have a large-scale circuit. Adopting a duty ratio controller having such a large-scale circuit along with a power factor correction device has caused the entire power conversion system to be large-scaled and costly. On the other hand, the method using pre-stored correlation tables has a problem that it is cumbersome to pre-set the data. It is desirable that a power factor correction device applied to an AC power generator using natural energy has a simple construction and control system.

There are occasions where it is necessary to adjust the gradient M(D), which is the proportion coefficient of the output voltage of generator vi and the output voltage Vo of the power factor correction device given by the formula Vo=M(D)·vi. In such occasions, it is necessary, according to the above Formulas 1 to 3, to adjust the function f in the formula Vcs=f(vi) in connection with the duty ratio controller. Adding such functions to the duty ratio controller causes its configuration to be further complicated.

The sixth embodiment provides a duty ratio controller, having a simple configuration, capable of adjusting the duty ratio control voltage inputted into the cs terminal of the PWM control IC, which is coupled with the power factor correction device.

The sixth embodiment thus provides a compactly-configured and low-cost power factor correction device capable of adjusting the duty ratio control voltage inputted into the cs terminal of the PWM control IC.

(7-1) BASIC CONFIGURATION OF SIXTH EMBODIMENT

Figure 10:
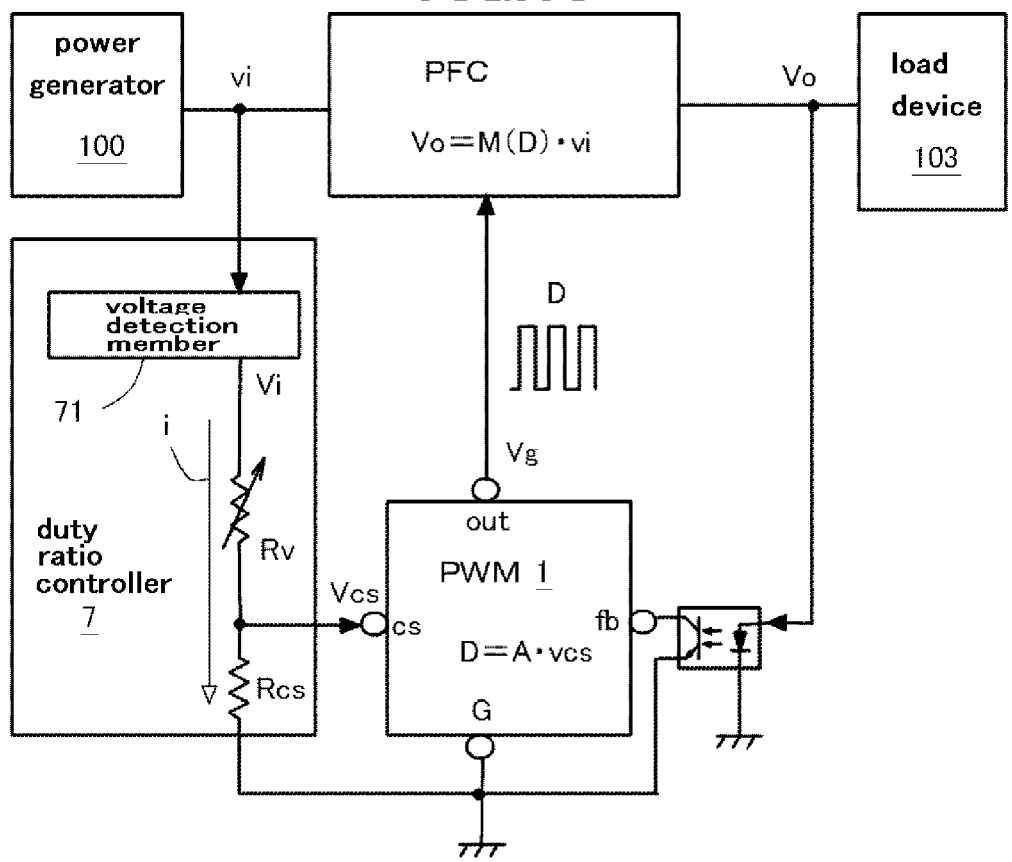
FIG. 10 is a view schematically showing a power factor correction device according to a sixth embodiment of the present disclosure, which includes a basic configuration of a duty ratio controller used for a PWM control IC.

FIG. 10 is a view schematically showing a power factor correction device according to a sixth embodiment of the present disclosure, which includes a basic configuration of a duty ratio controller used for a PWM control IC.

Illustrated is a power generator 100, which is typically an AC power generator of wind power plants. The output voltage of generator vi is an effective value or a value proportional to thereof of the phase voltage of the line voltage of the three-phase AC input.

The PWM control IC1 is configured to output from its out terminal a control signal vg having a duty ratio D proportional to the duty ratio control voltage Vcs inputted into the cs terminal. Using a typical triangular-wave comparison method, the control signal vg can be obtained as the output pulse signal of a comparator by inputting into the comparator a high-frequency triangular-wave voltage and the duty ratio control voltage Vcs. The relation between the duty ratio D and the duty ratio control voltage Vcs is given by the Formula 2 as described in the above.

The control signal vg is a pulse signal having a frequency of several kHz to several hundred kHz. By defining the time length of a period as T and of its on period as Ton, the duty ratio D is given by the below formula.

$$D=Ton/T \qquad \text{(Formula 4)}$$

PFC (Power Factor Correction device) is configured as in the above-described embodiments. Load device 103 is one of such load devices as various appliances, invertors (including grid-connected invertors), etc.

The relation between the output voltage of generator vi, which is the input voltage of the power factor correction device, and the output voltage Vo is represented by a linear function having a gradient M(D) as shown in the above Formula 1. The gradient M(D) varies as does the duty ratio D.

A duty ratio controller 7 in the sixth embodiment is inputted with the detected output voltage of generator vi and outputs the duty ratio control voltage Vcs. The duty ratio control voltage Vcs is inputted into the cs terminal of the PWM control IC.

The duty ratio controller 7 has a voltage detection member 71 which generates DC detection voltage Vi on the basis of the detected output voltage of generator vi. The DC detection voltage Vi is basically proportional to the output voltage of generator vi.

There is provided a current path between the duty ratio controller 7 and the ground potential through which current i is flown when applied with the DC detection voltage Vi. On the current path at least two resistance elements are arranged. The current flown in the current path varies as does the DC detection voltage Vi. The two resistance elements include a first resistance element Rv which is a variable resistance element and a second resistance element Rcs which has a constant resistance value. The end-to-end voltage of the second resistance element Rcs generated by current i is applied to the cs terminal of the PWM control IC1 as the duty ratio control voltage Vcs. The above relations are given by the below formulas.

$$Vi=B \cdot vi (B \text{ as a predetermined proportional coefficient}) \qquad \text{(Formula 5)}$$

$$i=Vi/(Rv+Rcs) \qquad \text{(Formula 6)}$$

$$Vcs=i \cdot Rcs \qquad \text{(Formula 7)}$$

The above Formulas 5 to 7 teaches that, when the first and second resistance elements Rv, Rcs are constant, the duty ratio control voltage Vcs caris so does the output voltage of generator vi.

The above Formulas 5 to 7 also teaches that, when the output voltage of generator vi is constant, variation of the output voltage of generator vi causes the current i to vary and accordingly the duty ratio control voltage Vcs to vary.

This means that it is possible to adjust the duty ratio D which corresponds to the duty ratio control voltage Vcs by adjusting the first resistance element Rv even incase the output voltage of generator vi is constant. This further means that it is possible to adjust the gradient M(D) of the output voltage Vo with respect to the input voltage of the power factor correction device (output voltage of generator) vi by adjusting the first resistance element Rv.

Figure 11:
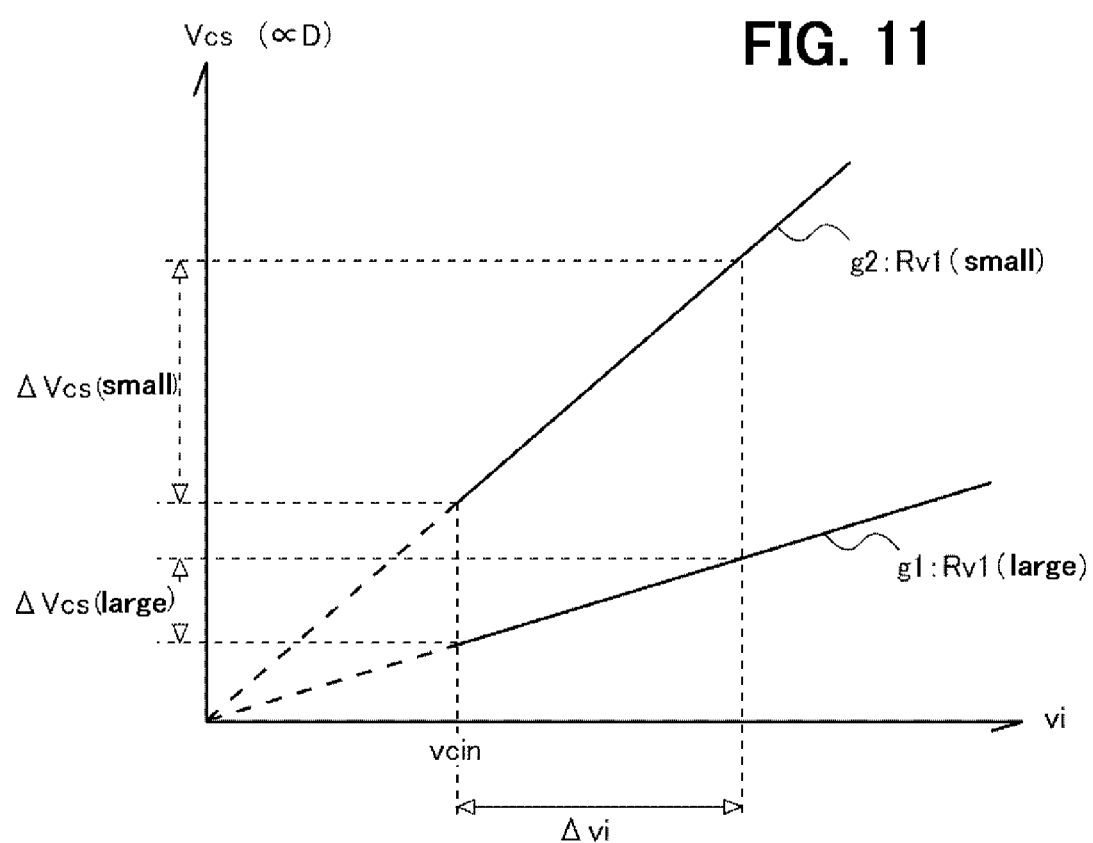
FIG. 11 is a graph schematically showing the relation between the output voltage of generator, which is the input voltage of the duty ratio controller, and the duty ratio control voltage, which is the output voltage of the duty ratio controller.

FIG. 11 is a graph schematically showing the relation between the output voltage of generator vi, which is the input voltage of the duty ratio controller 7, and the duty ratio control voltage Vcs, which is the output voltage of the duty ratio controller 7 on the basis of Formulas 5 to 7. The relation is represented by the line function g1 in case the first resistance element Rv is large and by the line function g2 in case the first resistance element Rv is small.

In wind power generation, it is usual that the output voltage of generator vi fluctuates largely. For example, assuming that the output voltage of generator vi varies within the range of Δvi, the duty ratio control voltage Vcs varies within the range of Δvcs (large) in case the first resistance element Rv is large and within the range of Δvcs (small) in case the first resistance element Rv is small.

In the graph of FIG. 11, vcin, a value of the output voltage of generator vi, indicates the cut-in voltage with which the generator starts extracting electric power (the power factor correction device starts power conversion). The line functions g1 and g2 in the range where the output voltage of generator vi is lower than the cut-in voltage vcin since the generator does not extract electric power in this range.

Although not shown in FIG. 10, the duty ratio controller 7 of the sixth embodiment may be configured so as to operate only when the output voltage of generator vi is not lower than the cut-in voltage vcin. This configuration will be described below with reference to FIGS. 13 and 14.

Figure 12:
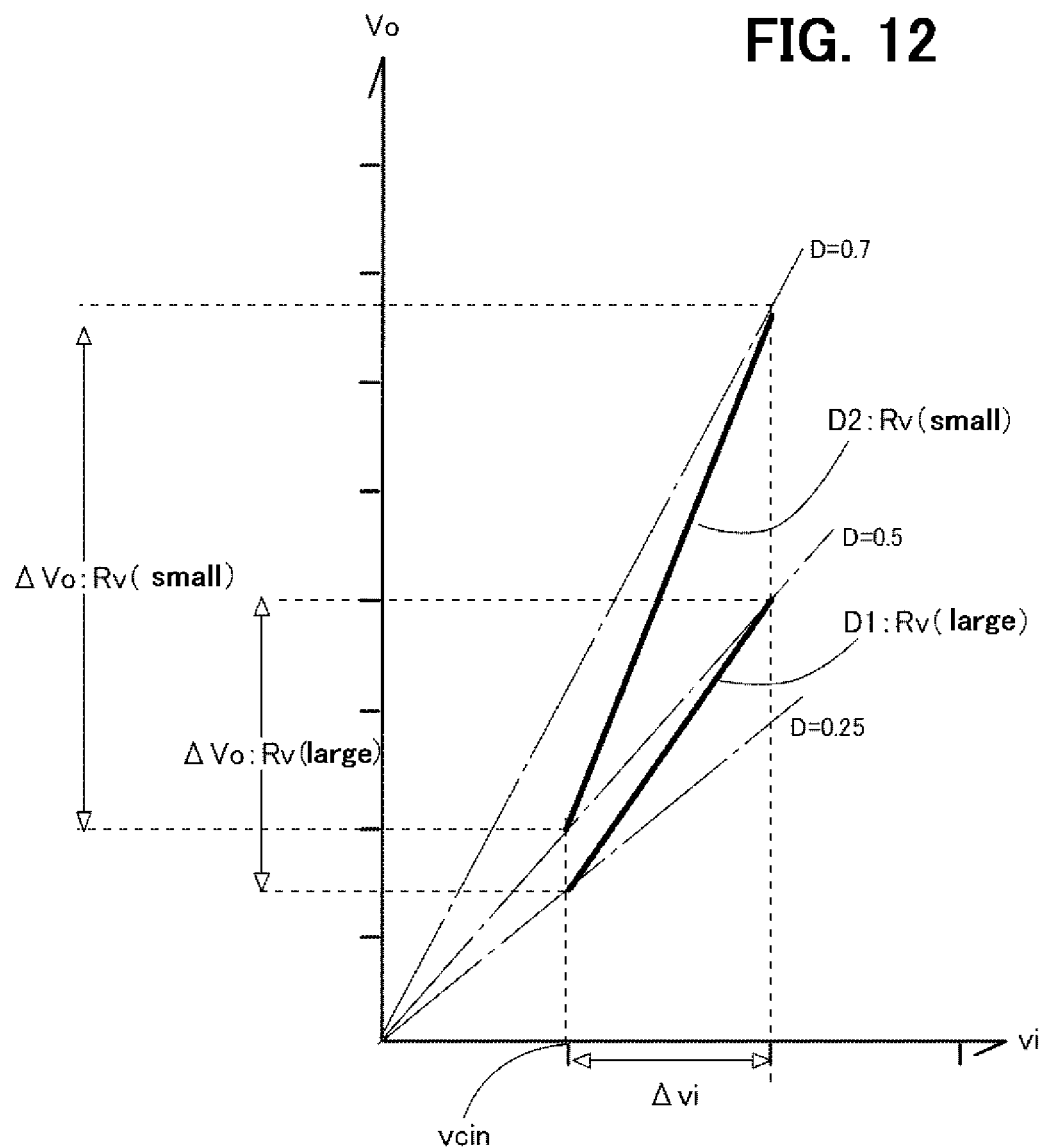
FIG. 12 is a graph schematically showing the relation between the output voltage of generator, which is the input voltage of the duty ratio controller, and the output voltage in case the first resistance element of the duty ratio controller is adjusted.

FIG. 12 is a graph schematically showing the relation between the output voltage of generator vi, which is the input voltage of the duty ratio controller 7, and the output voltage Vo in case the first resistance element Rv of the duty ratio controller 7 is adjusted as shown in FIG. 10.

In this example, 1/(1-D) is given as the function M(D) of vi and Vo for ease of explanation. As the power factor correction device is operated by the duty ratio controller 7 and the PWM control IC1 according to the sixth embodiment, the duty ratio D varies as does the output voltage of generator vi accordingly. As an example, shown in the graph of FIG. 12 by the tow-dotted lines are the relations between vi and Vo in the boosting converter in case the duty ratio D are constant values of 0.25, 0.5 and 0.7.

As exemplified in FIG. 10, the relation between the input voltage of the power factor correction device vi and the output voltage Vo is represented by a linear function varying along the line D1 in case the resistance value is small and the line D2 in case the resistance value is large.

For example, assuming that the output voltage of generator vi varies within the range of Δvi, the output voltage Vo varies within the range of ΔVo:Rv (large) in case the first resistance element Rv is large, with the duty ratio D varying in the range from 0.25 to 0.5 as illustrated. On the other hand, the output voltage Vo varies within the range of ΔVo:Rv (small) in case the first resistance element Rv is small, with the duty ratio D varying in the range from 0.5 to 0.7 as illustrated.

Thus, by adjusting the resistance value of the first resistance element Rv of the duty ratio controller 7, it is possible to adjust relation between the input voltage of the power factor correction device vi and the output voltage Vo. In the conventional power factor correction device, it has required a complicated and large-scale controller to enable changing the relation between the input voltage of the power factor correction device vi and the output voltage Vo. The six embodiment of the present invention enables it with a simple configuration and operation in which only one variable resistance element is adjusted. Thus, the power conversion system can be made compact and cost efficient.

(7-2) FIRST EXAMPLE OF SIXTH EMBODIMENT

<Circuit Configuration of First Example>

Figure 13:
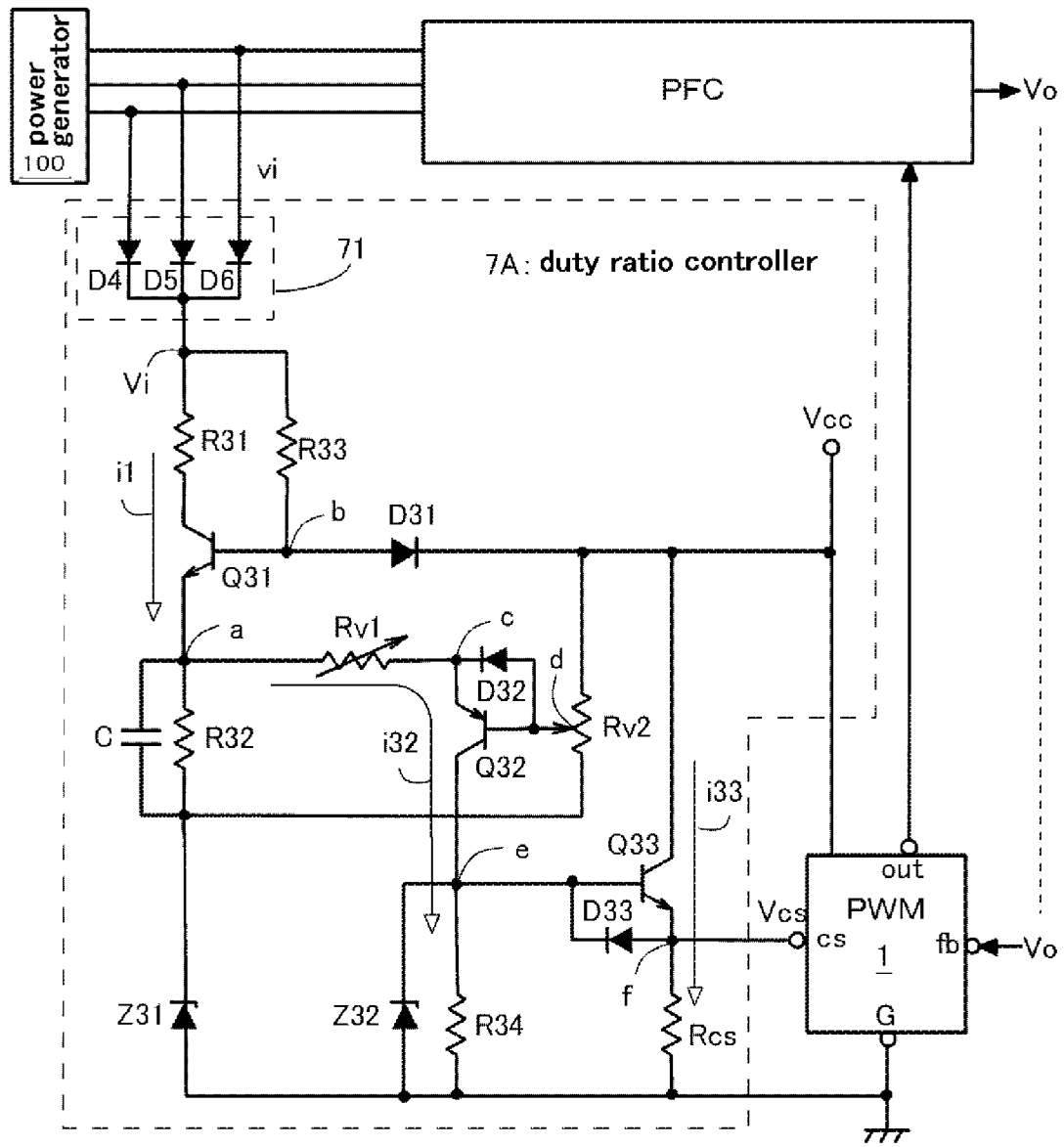
FIG. 13 is a view schematically showing a power factor correction device according to a sixth embodiment of the present disclosure, which includes an exemplary configuration of a duty ratio controller used for a PWM control IC.

FIG. 13 is a view schematically showing a power factor correction device according to a sixth embodiment of the present invention, which includes an exemplary configuration of a duty ratio controller used for a PWM control IC. The output voltage Vo is fed back to a feed back terminal fb of the PWM control IC1.

The generator 100 outputs a three-phase AC. The voltage detection member 71, which serves as the input terminal of the duty ratio controller 7A, detects the output voltage of generator vi and generates a DC detection voltage Vi which is proportional to the output voltage of generator vi. In this example, DC detection voltage Vi is obtained by adding the AC from the three-phase power source half-wave-rectified through the diodes D4, D5, D6. The voltage detection member 71 may be configured differently from the illustrated as long as it can generate DC detection voltage Vi based on and proportional to the output voltage of generator vi.

Between the diodes D4, D5, D6 and the collector of a (n-type) transistor Q31 is arranged a collector resistor R31, and between the diodes D4, D5, D6 and the is arranged a bias resistor R33. Between the emitter of the transistor Q31 and a Zener diode Z31 is arranged in parallel an emitter resistor R32 and a condenser C. The anode of the Zener diode Z31 is grounded.

The base of the transistor Q31 is connected to the anode of the diode 31. The cathode of the diode 31 is connected to the power source Vcc of the duty ratio controller 7.

Between the emitter of the transistor Q31 and the emitter of a transistor Q32 is arranged a first variable resistor Rv1. The first variable resistor Rv1 is designed to adjust the gradient of the input voltage of the power factor correction device (the output voltage of generator) vi and the output voltage Vo to a predetermined value.

Between the collector of the transistor Q32 and the ground potential is arranged in parallel a resistor R34 and a Zener diode Z32. The base of the transistor Q32 is connected to a middle point terminal of a second variable resistor Rv2. The second variable resistor Rv2 is designed to set a cut-in voltage vcin to a predetermined value. Between the base and the emitter of the transistor Q32 is arranged a diode D32. The second variable resistor Rv2 is connected to the power source Vcc and the cathode of the Zener diode Z31.

The base of a (n-type) transistor Q33 is connected to the collector of the transistor Q32, which is connected to the power source Vcc. The emitter of the transistor Q33 is connected to the cs terminal of the PWM control IC1. Between the base and the emitter of the transistor Q33 is arranged a diode D33.

<Circuit Operation of First Example>

Below described is an example of operation of the duty ratio controller 7A assuming that the output voltage of generator vi gradually increases from 0V to 200 to 300V in a wind power plant. In this example, the power source Vcc has a voltage of 24V, and the Zener diodes Z31 and Z32 each has a breakdown voltage of 5V.

Initiation of Power Generation

When the output voltage of generator vi, which is the DC detection voltage Vi, is 0V, current flows along the current path from the power source Vcc to the second variable resistor Rv2, the Zener diode Z31 and the ground. This current causes the voltage of the middle point terminal d of the second variable resistor Rv2 to have a predetermined potential, which is a divided potential from the power source Vcc. The potential of the middle point terminal d is set to correspond to the cut-in voltage vcin of the output voltage of generator vi.

Current also flows along the current path from the power source Vcc to the middle point terminal of the second variable resistor Rv2 (point d), diode D32, the first variable resistor Rv1, the emitter of the transistor Q31 (point a), resistor R32, Zener diode Z31 and the ground. The potential of the point a (the emitter of the transistor Q31) has a divided potential from the power source Vcc. The potential of the point b (the base of the emitter of the transistor Q31) is the DC detection voltage Vi. The correlation of the potentials of the above-mentioned points are as follows.

$$\text{point } b < \text{point } a < \text{point } c < \text{point } d < Vcc$$

When the DC detection voltage Vi is 0V, the transistor Q31 is non-conductive as the potential of the point b is lower than that of the point a, and the transistor Q32 is non-conductive as the potential of the point c is lower than that of the point d. The transistor Q33 is non-conductive unless the transistor Q32 becomes conductive. The diode D31 is reverse biased, the diode D32 is forward biased and the Zener diode Z31 has a breakdown voltage.

Conduction of Transistor Q31

The transistor Q31 is turned conductive when current flows therein as the potential of the point b becomes higher than that of point a. Now the DC detection voltage Vi causes current i1 to flows along the current path from the resistor R31 to the emitter of the transistor Q31, resistor R32, Zener diode Z31 and the ground. The potential of the point a has a divided potential determined on the basis of the resistor R31, the resistor R32 and the Zener diode Z32, which are applied with the DC detection voltage Vi. At this stage, the correlation of the potentials of the above-mentioned points are as follows.

$$\text{point } a < \text{point } b < \text{point } c < \text{point } d < Vcc$$

As the DC detection voltage Vi further increases, the potentials of both the point a and the point b increase. The transistor Q32 is non-conductive at least unless the potentials of the point a and the point c becomes higher than that of the point d.

Conduction of Transistors Q32 and Q33: Cut-In

The transistor Q32 is turned conductive when the potentials of the point a and the point c becomes higher than that of the point d as the DC detection voltage Vi increases. Now the DC detection voltage Vi causes current i2 to flows along the current path from the resistor R31 to the transistor Q31, the first variable resistor Rv1, the transistor Q32, the resistor R34 and the ground. The diode 32 turns non-conductive. The flow of the current i2 causes the potential of the point e to be higher than that of the point f and causes base current to flow in the transistor Q33, thereby turning the transistor Q33 conductive. This now causes current i3 to flows along the current path from the power source Vcc to the transistor Q33, the resistor Rcs and the ground. As the end-to-end voltage of the resistor Rcs in generated, the cs terminal of the PWM control IC1 is inputted with the duty ratio control voltage Vcs. Thus, the PWM control IC1 is initiated and the power factor correction device starts extracting electric power. At this stage, the correlation of the potentials of the above-mentioned points are as follows.

$$\text{point } d < \text{point } c < \text{point } a < \text{point } b < Vcc$$

The potential of the point d, which is the middle point terminal of the second variable resistor Rv2, is preset such that the output voltage of generator vi passing through the transistor Q32 and Q33 corresponds to the cut-in voltage vcin.

As the DC detection voltage Vi further increases, the potentials of the point a and the point b becomes higher than that of the power source Vcc. This causes the diode D31 to be forward biased and conductive. Bypassing the current generated by the DC detection voltage Vi through the resistor 33 and the diode D31 prevents large current from flowing into the transistor Q31.

During the extraction of electric power, the output voltage of generator vi, which is the DC detection voltage Vi, varies so does the currents i1, i2 and i3 respectively. The duty ratio control voltage Vcs also varies accordingly.

Adjusting Duty Ratio Control Voltage Vcs

It is possible to change the current i2 flowing in the transistor Q32 by adjusting the resistance value of the first variable resistor Rv1 while the output voltage of generator vi is constant. The current i2 decreases as the resistance value of the first variable resistor Rv1 increases and increases as the resistance value of the first variable resistor Rv1 decreases. This results in the change in the base current of the transistor Q33 and the current i3 flowing in the transistor Q33, and eventually the change in the duty ratio control voltage Vcs. Thus, as shown in FIGS. 11 and 12, it is possible to change the relation of the input voltage of the power factor correction device (the output voltage of generator) vi and the output voltage Vo by adjusting the resistance value of the first variable resistor Rv1. The adjustment can be conducted even during the operation of extraction of electric power.

(7-3) SECOND EXAMPLE OF SIXTH EMBODIMENT

<Circuit Configuration of Second Example>

Figure 14:
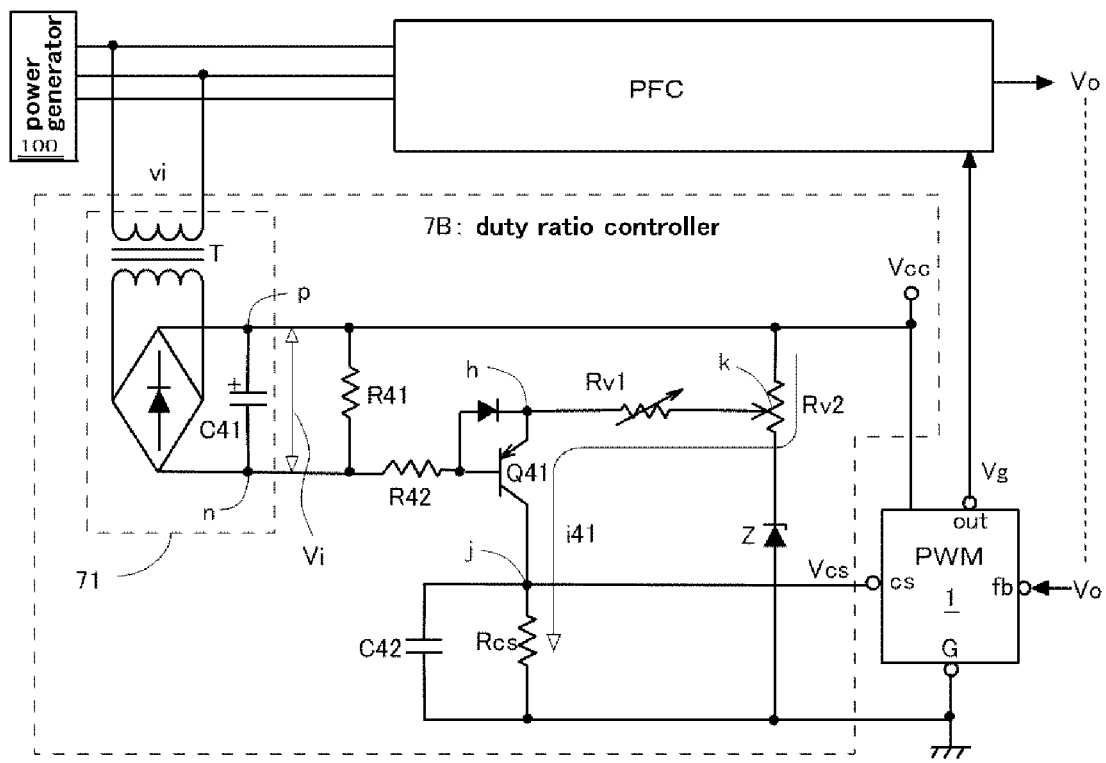
FIG. 14 is a view schematically showing a power factor correction device according to a sixth embodiment of the present disclosure, which includes another exemplary configuration of a duty ratio controller used for a PWM control IC.

FIG. 14 is a view schematically showing a power factor correction device according to a sixth embodiment of the present disclosure, which includes a second exemplary configuration of a duty ratio controller used for a PWM control IC.

The generator 100 outputs a three-phase AC in the same way as in the first example. The voltage detection member 71, which serves as the input terminal of the duty ratio controller 7B, detects the output voltage of generator vi and generates a DC detection voltage Vi which is proportional to the output voltage of generator vi. In this example, the voltage detection member 71 is made of a transformer T and a rectifying and smoothing circuit. The primary coil of the transformer T is connected to two phase lines of the three-phase AC power lines such that it is possible to obtain the stepped down AC voltage from the secondary coils. This means that the primary coil of the transformer T detects the line voltage of the three-phase AC input. The secondary primary coil of the transformer T is connected to the input terminal of a rectifying member. The rectifying member may be a bridge rectifying circuit, but not limited to it. The rectifying member has a positive electrode terminal p and a negative electrode terminal n having smoothing condenser C41 arranged therebetween. The voltage between the positive electrode terminal p and the negative electrode terminal n is the DC detection voltage Vi.

The power source Vcc of the duty ratio controller 7B is connected to the positive electrode terminal p of the voltage detection member 71. Accordingly, assuming the potential of the power source Vcc as the base potential, the potential of the negative electrode terminal n decreases down to the negative side of the base potential as the DC detection voltage Vi increases.

Between the power source Vcc and the negative electrode terminal n is arranged a resistor R41. The base of a (p-type) transistor Q41 is connected to the negative electrode terminal n by way of a resistor 42. The emitter of the transistor Q41 is connected to a middle point terminal of a second variable resistor Rv2 by way of a first variable resistor Rv1. Between the collector of the transistor Q41 and the ground is arranged in parallel a resistor Rcs and a condenser C42. The collector of the transistor Q41 is connected to a cs terminal of a PWM control IC1. The first variable resistor Rv1 is designed to adjust the gradient of the input voltage of the power factor correction device (the output voltage of generator) vi and the output voltage Vo to a predetermined value.

Between the power source Vcc and the gound is serially arranged the second variable resistor Rv2 and a Zener diode Z. The second variable resistor Rv2 is designed to set a cut-in voltage vcin to a predetermined value.

<Circuit Operation of Second Example>

Below described is an example of operation of the duty ratio controller 7B assuming that the output voltage of generator vi gradually increases from 0V to 200 to 300V in a wind power plant. In this example, the turn ratio of the transformer T is 20 to 1 (e.g. 200V for the primary while 10V for the secondary), the power source Vcc has a voltage of 24V, and the Zener diode Z has a breakdown voltage of 5V.

Initiation of Power Generation

When the output voltage of generator vi is 0V, the end-to-end voltage of the secondary coil of the transformer T is 0V. Accordingly, the DC detection voltage Vi, which is the output voltage of the rectifying and smoothing circuit, is 0V. The positive electrode terminal p and the negative electrode terminal both have potential same as that of the power source Vcc.

Current flows along the current path from the power source Vcc to the second variable resistor Rv2, the Zener diode Z and the ground. The Zener diode Z has a breakdown voltage. This current causes the voltage of the middle point terminal k of the second variable resistor Rv2 to have a predetermined potential, which is a divided potential from the power source Vcc. The potential of the middle point terminal k is set to correspond to the cut-in voltage vcin of the output voltage of generator vi. The correlation of the potentials of the above-mentioned points are as follows.

point $k$<point $n$=point $p=Vcc$

The point h of the emitter of the transistor Q41 is applied with the potential of the point k while the base is applied with the potential of the point n. The transistor Q41 is non-conductive as the potential of the point h is lower than that of the point n. As the DC detection voltage Vi increases above 0V, the potential of the point n decreases under the base potential of the power source Vcc.

Conduction of Transistors Q41: Cut-In

As the potential of the point n becomes lower than that of the point h and the base current flows, transistor Q41 turns conductive. Now current i41 flows along the current path from the power source Vcc to the middle point terminal (the point k) of the second variable resistor Rv2, the first variable resistor Rv1, the transistor Q41 and the resistor Rcs. As the end-to-end voltage of the resistor Rcs in generated, the cs terminal of the PWM control IC1 is inputted with the duty ratio control voltage Vcs. Thus, the PWM control IC1 is initiated and the power factor correction device starts extracting electric power. At this stage, the correlation of the potentials of the above-mentioned points are as follows.

point $j$ <point $n$ <point $h$ <point $k$ <point $p=Vcc$

The potential of the point k, which is the middle point terminal of the second variable resistor Rv2, is preset such that the output voltage of generator vi corresponds to the cut-in voltage vcin.

During the extraction of electric power, the output voltage of generator vi, which is the DC detection voltage Vi, varies so does the base current of the transistor Q41 and the current i41. The duty ratio control voltage Vcs also varies accordingly.

Adjusting Duty Ratio Control Voltage Vcs

It is possible to change the current i41 flowing in the transistor Q41 by adjusting the resistance value of the first variable resistor Rv1 while the output voltage of generator vi is constant. The current i41 decreases as the resistance value of the first variable resistor Rv1 increases and increases as the resistance value f the first variable resistor Rv1 decreases. This results in the change in the duty ratio control voltage Vcs. Thus, as shown in FIGS. 11 and 12, it is possible to change the relation of the input voltage of the power factor correction device (the output voltage of generator) vi and the output voltage Vo by adjusting the resistance value of the first variable resistor Rv1. The adjustment can be conducted even during the operation of extraction of electric power.

[8] SEVENTH EMBODIMENT

The seventh embodiment relates to the configuration of the for the purpose of achieving higher breakdown voltage in the switching elements which are connected to the primary coils of the transistors in the above-described power factor correction device.

The configuration in this embodiment may be employed not only in the above-described power factor correction device but also can be adapted to various kinds of switching power sources equipped with transistors such as AC-DC convertors, DC-DC convertors, etc. The input power may be not only sine waves but also direct current, pulse waves, etc. having a constant voltage, or square waves, etc. having a variable voltage and current. In such switching power sources, DC power is desirably extracted from the secondary coils by on-of controlling the switching elements connected to the primary coils so as to pass or interrupt the DC or AC current flowing therein.

Upon the switching elements is turned on, the counter electromotive force generates spike voltage in the primary coils of the transistors. Accordingly, the switching elements are required to have high resistive characteristics to the spike voltage. In case a single switching element is not capable of having enough resistive characteristics, two or more switching elements may be cascade-connected (each of the switching elements herein after referred to as a "sub-switching element").

In case two sub-switching elements are cascade-connected, it is required to on-off control these sub-switching elements synchronously. In Patent Document 8, for example, the control terminal (the gate terminal in case of FET) of a first sub-switching element is on-off controlled with a predetermined switching frequency while a second sub-switching element cascade-connected thereto is synchronously on-off controlled.

In this configuration, however, a circuit arranged to synchronize the on-off timing of the first and the second sub-switching elements has a complicated circuit configuration and requires a separate power source, which has resulted in enlargement of the device. The seventh embodiment provides a solution to this problem with the switching elements with a simple configuration and high resistive characteristics.

Described below is the configuration of one of the three input terminals in the above-described power factor correction device according to the seventh embodiment and description on the other two input terminals configured similarly is omitted. For ease of explanation, the input power is assumed to be high-voltage DC. Even in case input power is three-phase AC, the same applies in the high-voltage range.

(8-1) FIRST EXAMPLE OF A SEVENTH EMBODIMENT (BOOSTING SWITCHING POWER SOURCE)

<Circuit Configuration of First Example>

Figure 15:
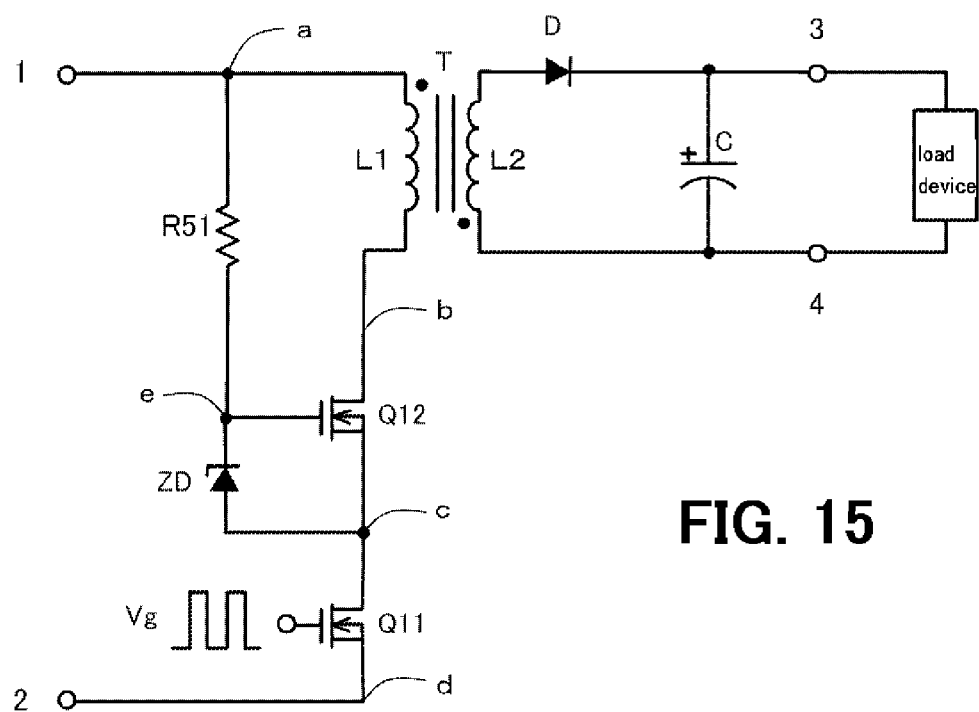
FIG. 15 is a view schematically showing a circuit configuration of an example of power factor correction device according to a seventh embodiment of the present invention.

FIG. 15 is a view schematically showing the circuit configuration of a first example of the power factor correction device according to the seventh embodiment of the present disclosure. In the circuit, DC voltage is applied between an input terminal 1 and an input terminal 2. In this example, the potential of the input terminal 2 is regarded as the base potential (which corresponds to the point e in the power factor correction device shown in FIG. 1) and the input terminal 1 is assumed to have a positive potential.

In the circuit is arranged a transformer T (which corresponds to any one of the transformers Tr, Ts, Tt of the power factor correction device shown in FIG. 1) having a primary coil L1 and a secondary coil L2. The winding start ends of the coils are shown by the black dots. The primary coil L1 and the secondary coil L2 are magnetically coupled, preferably having a coupling coefficient of 1. In case the coupling coefficient is less than 1, the spike voltage generated in the primary coil L1 being relatively high requires higher resistive characteristics of the switching elements.

The configuration of the secondary coil of the transformer is a flyback system, in which the anode of an output diode D is connected to the winding end end of the secondary coil L2 and a smoothing condenser C is arranged between the cathode of the output diode D and the winding start end of the secondary coil L2. Power is outputted between the both ends of the smoothing condenser, output terminals 3 and 4 (which corresponds to the positive electrode terminal p and the negative electrode terminal n in the power factor correction device shown in FIG. 1), and inputted into a load device.

One end of the primary coil L1 is connected to the input terminal 1 so as to be inputted with the input potential. Between the other end of the primary coil L1 and the input terminal 2 are arranged a first sub-switching element Q11 and a second sub-switching element Q12, which are serially aligned to form a cascade connection. In this example, the sub-switching elements are N-channel FETs.

The source of the first sub-switching element Q11 is connected to the input terminal 2 so as to be inputted with the base potential. Inputted into the gate of the first sub-switching element Q11 is a control voltage Vg which controls conduction and interruption of the current path between the drain and source of the first sub-switching element Q11. This means that the first sub-switching element Q11 is on-off controlled so as to pass or interrupt the current generated by the input voltage flowing into the primary coil L1. The control voltage Vg is a plus signal having a predetermined switching frequency and duty ratio generated by an external control member (not shown). In this configuration, the first sub-switching element Q11 is turned on when the gate has a high potential ad turned off when the gate has a low potential.

The second sub-switching element Q12 is arranged between the first sub-switching element Q11 and the primary coil having its drain connected to the other end of the primary coil L1 and its source connected to the drain of the first sub-switching element Q11.

Between the gate and the source of the second sub-switching element Q12 is arranged a Zener diode ZD. The Zener diode ZD is arranged so as to be reverse biased with respect to the direction of the on-control voltage inputted into the second sub-switching element Q12. The Zener diode ZD is has its cathode ad anode respectively connected to the gate and the source of the second sub-switching element Q12, which is an n-channel FET, to comply with the direction of the on-control voltage inputted into the second sub-switching element Q12.

The Zener voltage of the Zener diode ZD is set to be substantially higher than the threshold voltage of the gate of the second sub-switching element Q12 and substantially lower than the input voltage between the input potential and the base potential.

Between the gate of the second sub-switching element Q12 and the one end of the primary coil L1 is arranged a resistance element R51. Accordingly, the input voltage between the terminal 1 and the input terminal 2 is divided by the resistance element R51, the Zener diode ZD and the first sub-switching element Q11. The Zener diode ZD is disposed to be reverse biased with respect to this input voltage.

For another example, the input terminal 1 may have a negative input potential. In that case, P-channel FETs are used as the sub-switching elements Q11 and Q12. In comparison to the above-described configuration, the sub-switching elements Q11 and Q12 each has its source and drain in reversed positions, the Zener diode ZD also has a reverse polarity, the output diode is connected to the winding start end of the secondary coil L2 and the smoothing condenser C is disposed to have a reverse polarity.

<Circuit Operation of First Example>

Figure 16:
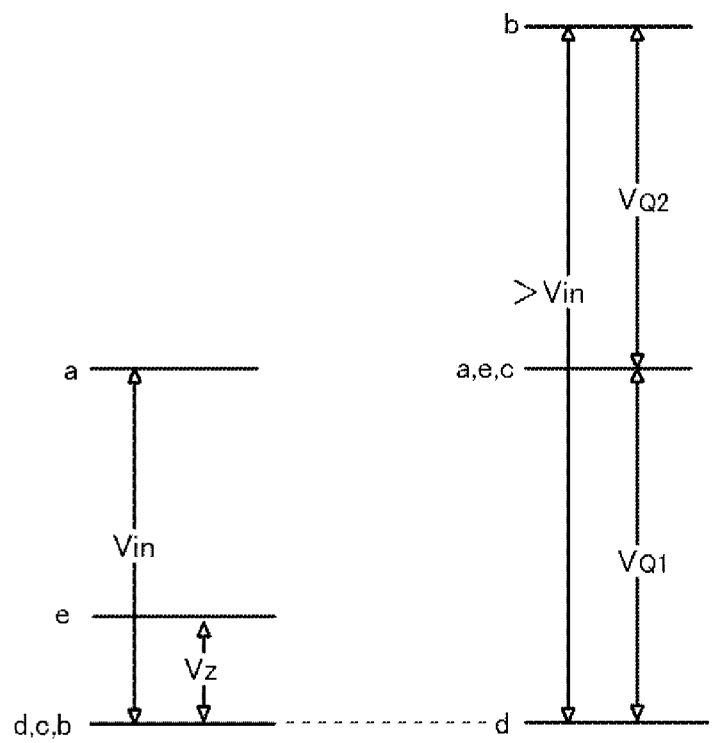
FIG. 16 includes two view (A) and (B) schematically showing the relation of the potentials during the on and off period in the circuit shown in FIG. 15.

FIGS. 16(a), (b) are views schematically showing the relation of the potentials for the purpose of illustrating the operation of the circuit shown in FIG. 15. FIG. 16(a) shows the control voltage Vg of the first sub-switching element Q11 during on period (immediately after the start of the on period). FIG. 16(b) shows the control voltage Vg of the first sub-switching element Q11 during off period (immediately after the start of the off period). The details are described below referring to the points a to de shown in FIG. 15.

Operation During On Period

Upon the control signal Vg is turned on, the first sub-switching element Q11 turns conductive and the voltage between the drain and the source of the first sub-switching element Q11 (the voltage between the point c and the point d) becomes zero. Now the potential of the point c and the point d is regarded as the base potential.

The point a is constantly applied with the input voltage Vin. In this example, the input voltage Vin is about 300V above the base potential, which is substantially higher than the Zener voltage Vz of the Zener diode ZD of about 20 V. The voltage between the point a and the point d is divided by the resistance element R51 and the Zener diode ZD. The end-to-end voltage of the Zener diode ZD, which is equivalent to the voltage between the gate and the source of the second sub-switching element Q12 (the voltage between the point e and the point c) becomes the Zener voltage Vz. The Zener voltage Vz is set to be substantially higher than the Zener voltage of the Zener diode ZD is set to be substantially higher than the threshold voltage, which is the on voltage, of the gate of the second sub-switching element Q12. This causes the second sub-switching element Q12 to be conductive and the voltage between the drain and the source of the second sub-switching element Q12 (the voltage between the point b and the point c) becomes zero. Now the potential of the point b, the point c and the point d is regarded as the base potential.

The Zener diode ZD has the function to provide the gate of the second sub-switching element Q12 with its threshold voltage during the on period as well as it functions as a protective diode preventing the gate and the source of the second sub-switching element Q12 from being applied with an excessively high voltage.

In the transformer T, the winding start ends of the primary coil L1 is applied with the input voltage Vin so as to cause current to flow therein and electromotive force to be generated in the secondary coil L2. However, as the output diode D is reverse biased, secondary current does not flow and magnetic energy is accumulated in the transformer T.

Operation During Off Period

Upon the control signal Vg is turned off, the current path between the drain and the source of the first sub-switching element Q11 is interrupted and spike voltage is instantaneously generated in the primary coil L1. The spike voltage causes the potential of the point b, which is the winding end end of the primary coil L1, to be substantially higher than the that of the point a, which is the input potential Vin. This causes rise in the potential of the point c, which is the connecting point of the first sub-switching element Q11 and the second sub-switching element Q12.

As the anode of the Zener diode ZD is connected to the point c and the cathode is connected to the input potential Vin byway of the resistance element R51, the potential of the point c does not exceed the input potential Vin, which is potential of the point a.

In other words, as the second sub-switching element Q12 is a source follower circuit, the potential of the point c, which is the source of the second sub-switching element Q12, does not exceed the potential of the point e, which does not exceed the potential of the input potential Vin (the potential of the point a). Accordingly, the potential of the point c does not exceed that of the point a.

This means that the Zener diode ZD functions as the protective diode even during the off time. As the potentials of the points a, e and c eventually become almost the same and the voltage between the gate and the source of the second sub-switching element Q12 (the voltage between the point e and the point c) becomes substantially lower than the threshold voltage of the gate, the second sub-switching element Q12 is interrupted. As a result, the voltage between the point b and the point d is divided by the first sub-switching element Q11 and the second sub-switching element Q12. As the potential of the point c, which is the middle point between the first sub-switching element Q11 and the second sub-switching element Q12, is substantially fixed on the basis of the potential of the point a, the voltage is divided relatively evenly.

The above-described operations during the on- and off-periods occur instantaneously. This means that on-off controlling the first sub-switching element Q11 with the control voltage Vg also causes a synchronous on-off control of the second sub-switching element Q12 in the circuit configuration shown in FIG. 15. Furthermore, it is made possible to on-off control the second sub-switching element Q12 by only arranging one Zener diode ZD and one resistance element R51. In this circuit configuration, it is not necessary to arrange a power source or a complicated driving circuit for the second sub-switching element Q12 as it obtains power from the input voltage.

In the off period, as the winding end end of the secondary coil L2 has a positive potential and the output diode D is forward biased, current flows into the load device and the smoothing condenser C is charged while the magnetic energy accumulated in the transformer T is discharged.

(8-2) SECOND EXAMPLE OF SEVENTH EMBODIMENT (BOOSTING SWITCHING POWER SOURCE)

<Circuit Configuration of Second Example>

Figure 17:
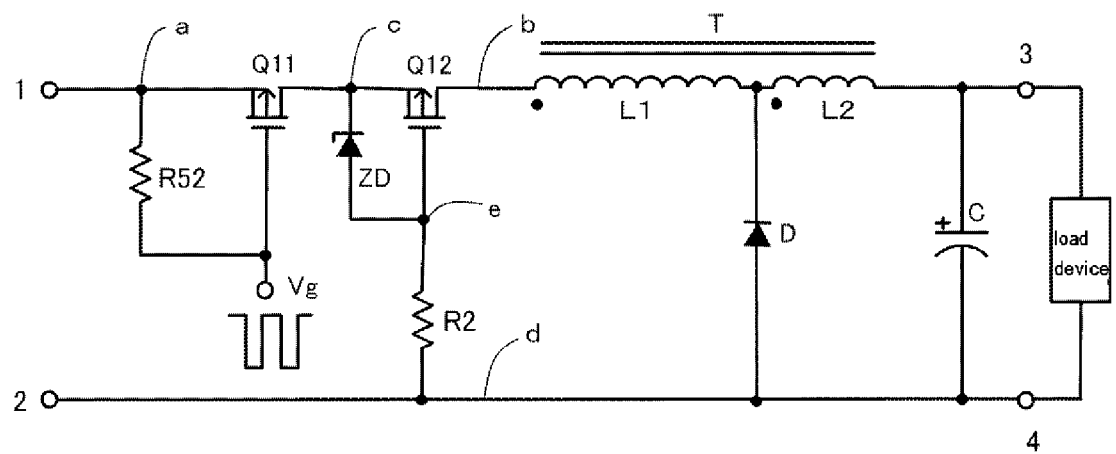
FIG. 17 is a view schematically showing a circuit configuration of another example of power factor correction device according to a seventh embodiment of the present disclosure.

FIG. 17 is a view schematically showing the circuit configuration of a second example of the power factor correction device according to the seventh embodiment of the present.

In this circuit configuration, DC voltage is applied between input terminals 1 and 2. In this example, the potential of the input terminal 2 is regarded as the base potential and the input terminal 1 has a positive input potential. There are arranged an output terminal 3 having a positive output potential and an output terminal 4 connected to the input terminal 2 and having the base potential.

There is arranged a transformer T having a coupled inductor including a primary coil L1 and a secondary coil L2. The winding start ends of the coils are shown by the black dots. Similar to the above-described first embodiment, the primary coil L1 and the secondary coil L2 are magnetically coupled, preferably having a coupling coefficient of 1. The winding end end of the secondary coil L2 is connected to the output terminal 3. Between the output terminals 3 and 4 is arranged in parallel a smoothing condenser C and a load device.

The intermediate tap of the transformer T connecting the primary coil L1 and the secondary coil L2 is connected to the cathode of a reflux diode D and the anode of a reflux diode D is connected to the output terminal 4 having the base potential.

Between the input terminal 1 and the primary coil L1 are arranged a first sub-switching element Q11 and a second sub-switching element Q12, which are serially aligned to form a cascade connection. In this example, the sub-switching elements are P-channel FETs.

The source of the first sub-switching element Q11 is connected to the input terminal 1 and inputted with the input voltage. Between the source and the gate of the first sub-switching element Q11 is arranged a resistance element R52. The voltage between the gate and the source is applied by way of the resistance element R52. Inputted into the gate of the first sub-switching element Q11 is a control voltage Vg which controls conduction and interruption of the current path between the drain and source of the first sub-switching element Q11. This means that the first sub-switching element Q11 is on-off controlled so as to pass or interrupt the current generated by the input voltage flowing into the primary coil L1. The control voltage Vg is a plus signal having a predetermined switching frequency and duty ratio generated by an external control member (not shown). In this configuration, the first sub-switching element Q11 is turned on when the gate has a low potential ad turned off when the gate has a high potential.

The second sub-switching element Q12 is arranged between the first sub-switching element Q11 and the primary coil having its source connected to the drain of the first sub-switching element Q11 and its drain connected to the other end of the primary coil L1.

Between the gate and the source of the second sub-switching element Q12 is arranged a Zener diode ZD. The Zener diode ZD is arranged so as to be reverse biased with respect to the direction of the on-control voltage inputted into the second sub-switching element Q12. The Zener diode ZD is has its cathode ad anode respectively connected to the source and the gate of the second sub-switching element Q12, which is an p-channel FET, to comply with the direction of the on-control voltage inputted into the second sub-switching element Q12.

The Zener voltage of the Zener diode ZD is set to be substantially higher than the threshold voltage of the gate of the second sub-switching element Q12 and substantially lower than the input voltage between the input potential and the base potential.

Between the gate of the second sub-switching element Q12 and the input terminal 2 is arranged a resistance element R2.

For another example, the input terminal 1 may have a negative input potential. In that case, N-channel FETs are used as the sub-switching elements Q11 and Q12. In comparison to the above-described configuration, the sub-switching elements Q11 and Q12 each has its source and drain in reversed positions, the Zener diode ZD also has a reverse polarity, the reflux diode and the smoothing condenser C is disposed to have a reverse polarity.

<Circuit Operation of Second Example>

Figure 18:
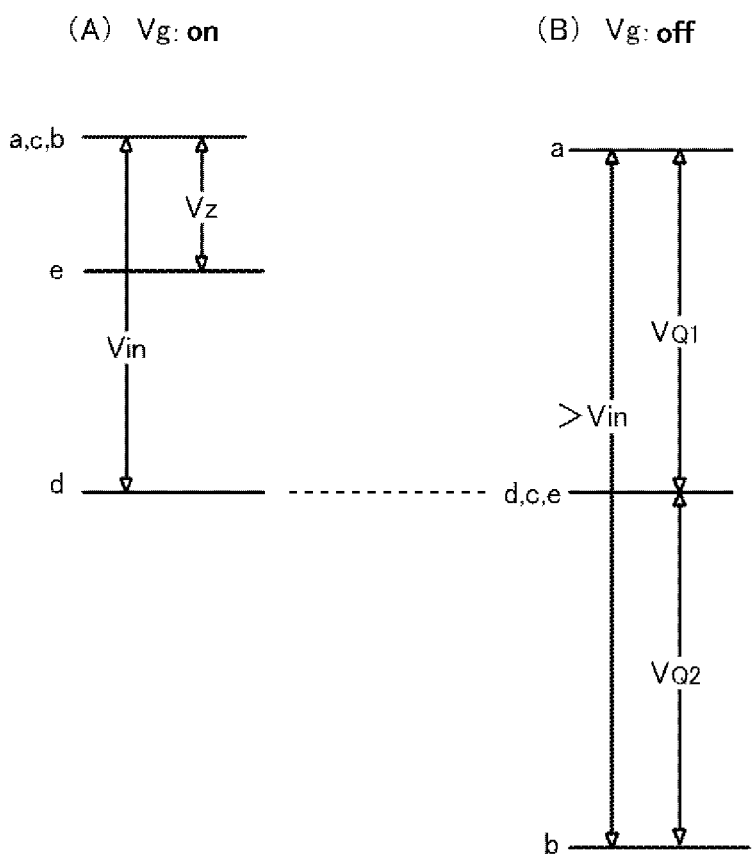
FIG. 18 includes two views (A)(B) schematically showing the relation of the potentials during the on and off period in the circuit shown in FIG. 17.

FIG. 18(a), (b) are views schematically showing the relation of the potentials for the purpose of illustrating the operation of the circuit shown in FIG. 17. FIG. 18(a) shows the control voltage Vg of the first sub-switching element Q11 during on period (immediately after the start of the on period). FIG. 18(b) shows the control voltage Vg of the first sub-switching element Q11 during off period (immediately after the start of the off period). The details are described below referring to the points a to de shown in FIG. 17.

Operation During On Period

Upon the control signal Vg is turned on, the first sub-switching element Q11 turns conductive and the voltage between the source and the drain of the first sub-switching element Q11 (the voltage between the point a and the point c) becomes zero. Now the potential of the point a and the point c is regarded as the base potential.

The point a is constantly applied with the input voltage Vin. In this example, the input voltage Vin is about 300V above the base potential, which is substantially higher than the Zener voltage Vz of the Zener diode ZD of about 20 V. The voltage between the point c and the point d is divided by the Zener diode ZD and the resistance element R2. The end-to-end voltage of the Zener diode ZD, which is equivalent to the voltage between the gate and the source of the second sub-switching element Q12 (the voltage between the point c and the point e) becomes the Zener voltage Vz. The Zener voltage Vz is set to be substantially higher than the Zener voltage of the Zener diode ZD is set to be substantially higher than the threshold voltage of the gate of the second sub-switching element Q12. This causes the second sub-switching element Q12 to be conductive and the voltage between the source and the drain of the second sub-switching element Q12 (the voltage between the point c and the point b) becomes zero. Now the potential of the point a, the point c and the point b is regarded as the base potential.

The Zener diode ZD has the function to provide the gate of the second sub-switching element Q12 with its threshold voltage during the on period as well as it functions as a protective diode preventing the gate and the source of the second sub-switching element Q12 from being applied with an excessively high voltage.

As a result, the point b, which is the winding start ends of the primary coil L1, is applied with the input voltage Vin so as to cause current to flow in the primary coil L1 and the secondary coil L2, thereby providing current flow into the load device and charging the smoothing condenser C. As the current also works as excitation current, magnetic energy is accumulated in the transformer T.

Operation During Off Period

Upon the control signal Vg is turned off, the current path between the source and the drain of the first sub-switching element Q11 is interrupted and spike voltage is instantaneously generated in the primary coil L1. The spike voltage causes the potential of the point b, which is the winding start end of the primary coil L1, to be substantially lower than the that of the point d, which is the input potential Vin. This causes fall in the potential of the point c, which is the connecting point of the first sub-switching element Q11 and the second sub-switching element Q12.

As the cathode of the Zener diode ZD is connected to the point c and the cathode is connected to the point d by way of the resistance element R2, the potential of the point c does not fall short of the base potential, which is potential of the point d.

In other words, as the second sub-switching element Q12 is a source follower circuit, the potential of the point c, which is the source of the second sub-switching element Q12, does not fall short of the potential of the point e, which does not fall short of the base potential (the potential of the point d). Accordingly, the potential of the point c does not fall short of that of the point d.

This means that the Zener diode ZD functions as the protective diode even during the off time. As the potentials of the points d, e and c eventually become almost the same and the voltage between the gate and the source of the second sub-switching element Q12 (the voltage between the point e and the point c) becomes substantially lower than the threshold voltage of the gate, the second sub-switching element Q12 is interrupted. As a result, the voltage between the point a and the point b is divided by the first sub-switching element Q11 and the second sub-switching element Q12. As the potential of the point c, which is the middle point between the first sub-switching element Q11 and the second sub-switching element Q12, is substantially fixed on the basis of the potential of the point d, the voltage is divided relatively evenly.

The above-described operations during the on- and off-periods occur instantaneously. This means that on-off controlling the first sub-switching element Q11 with the control voltage Vg also causes a synchronous on-off control of the second sub-switching element Q12 in the circuit configuration shown in FIG. 17. Furthermore, it is made possible to on-off control the second sub-switching element Q12 by only arranging one Zener diode ZD and one resistance element R2. In this circuit configuration, it is not necessary to arrange a power source or a complicated driving circuit for the second sub-switching element Q12 as it obtains power from the input voltage.

In the off period, as the winding start end of the secondary coil L2 has a negative potential, the winding end end of the secondary coil L2 has a positive potential, and the reflux diode D is forward biased, current flows into the load device and the smoothing condenser C is charged while the magnetic energy accumulated in the transformer T is discharged.

(8-3) OTHER FEATURES

In the power factor correction device of the seventh embodiment, as the first and the second sub-switching elements are serially aligned to form a cascade connection, so as to cooperatively exhibit their resistive characteristics to the spike voltage generated in the primary coil. In this case, on-off controlling the first sub-switching element causes a synchronous on-off control of the second sub-switching element. In this configuration, it is made possible to on-off control the second sub-switching element with only one Zener diode ZD and one resistance element without necessitating it to arrange a power source or a complicated driving circuit for the second sub-switching element. Accordingly, there is provided a switching power source of a power factor correction device in which the switching elements have a simple configuration and high resistive characteristics.

Additionally explained are switching power sources similar to power factor correction devices which are inputted with variable voltage and current such as AC, pulse waves, etc. These devices operates in the same way as described in the above when the input voltage is substantially higher than the Zener voltage of their Zener diodes ZD. On the other hand, the input voltage is lower than the Zener voltage of their Zener diodes ZD, the second sub-switching element Q12 remains to be off and switching power is not generated. However, in case the term in which the input voltage becomes lower than the Zener voltage is short enough, it can be ignored. If that is not the case, there may be arranged a way to apply voltage exceeding the gate threshold voltage to the gate of the second sub-switching element Q12 while it fails to be on (at least during the on-period of the first switching element).

It is preferable that the input voltage is set to be substantially higher, 10 times higher for example, than the Zener voltage. On the other hand, the Zener voltage needs to be substantially higher than the gate threshold voltage of the second sub-switching element Q12.

Alternatively, the first sub-switching element Q11 and the second sub-switching element Q12 may be IGBTs or bipolar transistors. In that case, a reflux diode is arranged to be connected in reverse parallel to each of the sub-switching elements as in the power factor correction device shown in FIG. 1.

REFERENCE SYMBOLS

R, S, T input terminal
p positive electrode terminal
n negative electrode terminal
Tr, Ts, Tt transformer
Lr1, Ls1, Lt1 primary coil
Lr2, Ls2, Lt2 secondary coil
Lr21, Ls21, Lt21 first secondary coil
Lr22, Ls22, Lt22 second secondary coil
Q1, Q2, Q3 switching element (FET)
D1, D2, D3 rectifying device (output diode)
D1', D2', D3' rectifying device (output diode)
D4, D5, D6, D14, D15, D16 rectifying device (reflux diode)
C smoothing condenser The series of paragraphs below recites various illustrative combinations of features of the present disclosure. These paragraphs are intended to represent a non-limiting presentation of suitable combinations, and are alphanumerically designated for clarity and efficiency:

A0. It is an object of the present disclosure to provide a power factor correction device for three-phase AC-DC conversion which enables effective power factor correction and stable power conversion with a simple construction and control system. There is provided a power factor correction device comprising: first, second and third input terminals to which three-phase AC is inputted; a positive electrode terminal p and a negative electrode terminal n each connected to a load device; first, second and third transformers Tr, Ts, Tt each having a primary coil with an end connected to said first, second and third input terminals; one or more switching elements having ends D applied with the voltage of another end of said primary coil, other ends S connected to a common potential terminal on the side of said primary coil and control ends G; first, second and third rectifying devices D1, D2, D3 having ends applied with the voltage of another end of said secondary coil so as to pass the current flow into said positive electrode terminal p; a smoothing condenser C disposed between said positive electrode terminal p and said negative electrode terminal n; wherein the control ends of said switching elements are controlled by a single control signal having a constant duty ratio.

B0. A power factor correction device comprising:
(a) first, second and third input terminals (R, S, T) to which three-phase AC is inputted;
(b) a positive electrode terminal (p) and a negative electrode terminal (n);
(c) first, second and third transformers (Tr, Ts, Tt) respectively having primary coils (Lr1, Ls1, Lt1) with one ends respectively connected to said first, second and third input terminals (R, S, T) and secondary coils (Lr2, Ls2, Lt2) with one ends respectively connected to said negative electrode terminal (n);
(d) one or more switching elements having control ends (G) on-off controlled so as to open/close the current path between the other ends of said primary coils (Lr1, Ls1, Lt1) of said first, second and third transformers (Tr, Ts, Tt) and a common potential terminal (e) on the side of said primary coils;
(e) first, second and third rectifying devices (D1, D2, D3) respectively disposed between the other ends of said secondary coils (Lr2, Ls2, Lt2) of said first, second and third transformers (Tr, Ts, Tt) and said positive electrode terminal (p) so as to pass current flow into said positive electrode terminal when the other ends of said secondary coils have forward-biased potentials and block current flow into said positive electrode terminal when the other ends of said secondary coils have reverse-biased potentials; and
(f) a smoothing condenser (C) disposed between said positive electrode terminal (p) and said negative electrode terminal; wherein
(g) the control ends of said one or more switching elements (G) are controlled by a single control signal having a constant duty ratio.

B1. The power factor correction device as set forth in B0, wherein said one or more switching elements comprise first, second and third switching elements (Q1, Q2, Q3) respectively disposed between the other ends of said primary coils (Lr1, Ls1, Lt1) of said first, second and third transformers (Tr, Ts, Tt) and a common potential terminal (e) on the side of said primary coils.

B2. The power factor correction device as set forth in B0 or B1, wherein said one or more switching elements comprise a single switching element (Q) disposed between the other ends of said primary coils (Lr1, Ls1, Lt1) of said first, second and third transformers (Tr, Ts, Tt) and a common potential terminal (e) on the side of said primary coils.

B3. The power factor correction device as set forth in any one of B0 to B2 further comprising fourth, fifth and sixth rectifying devices (D4, D5, D6) passing reflux current flow from said common potential terminal (e) into said first, second and third input terminals (R, S, T) by way of said primary coils (Lr1, Ls1, Lt1) of said first, second and third transformers (Tr, Ts, Tt).

B4. The power factor correction device as set forth in any one of B0 to B2 further comprising fourth, fifth and sixth rectifying devices (D14, D15, D16) passing direct reflux current flow from said common potential terminal (e) into said first, second and third input terminals (R, S, T).

C0. A power factor correction device comprising:
(a) first, second and third input terminals (R, S, T) to which three-phase AC is inputted;
(b) a positive electrode terminal (p) and a negative electrode terminal (n);
(c) first, second and third transformers (Tr, Ts, Tt) respectively having a primary coils (Lr1, Ls1, Lt1) with one ends respectively connected to said first, second and third input terminals (R, S, T), first secondary coils (Lr21, Ls21, Lt21) with other ends respectively connected to said negative electrode terminal (n) and second secondary coils (Lr22, Ls22, Lt22) with one ends respectively connected to said negative electrode terminal (n);
(d) one or more switching elements having control ends (G) on-off controlled so as to open/close the current path between the other ends of said primary coils (Lr1, Ls1, Lt1) of said first, second and third transformers (Tr, Ts, Tt) and a common potential terminal (e) on the side of said primary coils;
(e) first, second and third rectifying devices (D1, D2, D3) respectively disposed between the one ends of said first secondary coils (Lr21, Ls21, Lt21) of said first, second and third transformers (Tr, Ts, Tt) and said positive electrode terminal (p) so as to pass current flow into said positive electrode terminal when the one ends of said first secondary coils have forward-biased potentials and block current flow into said positive electrode terminal when the one ends of said first secondary coils have reverse-biased potentials;
(f) fourth, fifth and sixth rectifying devices (D1', D2', D3') respectively disposed between the other ends of said second secondary coils (Lr22, Ls22, Lt22) of said first, second and third transformers (Tr, Ts, Tt) and said positive electrode terminal (p) so as to pass current flow into said positive electrode terminal when the other ends of said second secondary coils have forward-biased potentials and block current flow into said positive electrode terminal when the other ends of said second secondary coils have reverse-biased potentials; and
(g) a smoothing condenser (C) disposed between said positive electrode terminal (p) and said negative electrode terminal; wherein
(h) the control ends of said one or more switching elements are controlled by a single control signal having a constant duty ratio.

C1. The power factor correction device as set forth in C0, wherein said one or more switching elements comprise first, second and third switching elements (Q1, Q2, Q3) respectively disposed between the other ends of said primary coils (Lr1, Ls1, Lt1) of said first, second and third transformers (Tr, Ts, Tt) and a common potential terminal (e) on the side of said primary coils.

C2. The power factor correction device as set forth in C0, wherein said one or more switching elements comprise a single switching element (Q) disposed between the other ends of said primary coils (Lr1, Ls1, Lt1) of said first, second and third transformers (Tr, Ts, Tt) and a common potential terminal (e) on the side of said primary coils.

C3. The power factor correction device as set forth in any one of C0 to C2, further comprising seventh, eighth and ninth rectifying devices (D4, D5, D6) passing reflux current flow from said common potential terminal (e) into said first, second and third input terminals (R, S, T) by way of said primary coils (Lr1, Ls1, Lt1) of said first, second and third transformers (Tr, Ts, Tt).

C4. The power factor correction device as set forth in any one of C0 to C2 further comprising seventh, eighth and ninth rectifying devices (D14, D15, D16) passing direct reflux current flow from said common potential terminal (e) into said first, second and third input terminals (R, S, T).

C5. The power factor correction device as set forth in any one of Claims C0 to C4, wherein said primary coils (Lr1, Ls1, Lt1) and said first secondary coils (Lr21, Ls21, Lt21) are respectively loosely magnetically coupled, and said primary coils (Lr1, Ls1, Lt1) and said second secondary coils (Lr22, Ls22, Lt22) are respectively tightly magnetically coupled.

C6. The power factor correction device as set forth in any one of Claims C0 to C5 further comprising a voltage detection element detecting input voltage of three-phase AC and an element determining a duty ratio corresponding to the detected input voltage and generating a control signal having the determined duty ratio.

C7. The power factor correction device as set forth in C6, wherein the correspondence relation between said input voltage and said duty ratio is preset.

C8. The power factor correction device as set forth in any one of Claims B0 to C7 further comprising a duty ratio controller (7) which is applied to a PWM control IC (1) having an output terminal (out) outputting the control signal and a control terminal (cs) inputted with a duty ratio control voltage (Vcs) for controlling the duty ratio (D) of the control signal, said duty ratio controller (7) having
a voltage detecting member (71) detecting AC input voltage (vi) inputted into the power factor correction device and generating DC detection voltage (Vi) proportional to the detected AC input voltage (vi),
a current path passing current which is variable in accordance with the variation of the generated DC detection voltage (Vi),
a first resistance element (Rv1) disposed on said current path and having a variable resistance value, and
a second resistance element (Rcs) disposed on said current path and having a constant resistance value, said first and second resistance elements being serially aligned, whereby the current passing through said second resistance element (Rcs) is controlled by adjusting the resistance vale of said first resistance element (Rv1), and the end-to-end voltage of said second resistance element (Rcs) is outputted to said PWM control IC (1) as the duty ratio control voltage (Vcs).

C9. The power factor correction device as set forth in any one of B0 to C8, wherein
one of said one or more switching elements comprises a first sub-switching element (Q11) and a second sub-switching element (Q12),
said first sub-switching element (Q11) a control end having an end connected to said common potential terminal (e) and on-off controlled so as to pass or interrupt the current flowing into said primary coils, and said second sub-switching element (Q12) being disposed between said first sub-switching element (Q11) and the primary coil (L1) in serial alignment with said first sub-switching element (Q11) and having a control end, and wherein
said power factor correction device further comprises
a Zener diode (ZD) disposed between the connecting point of said first and second sub-switching elements (Q11, Q12) and the control terminal of said second sub-switching element (Q12), and
a resistance element (R51) disposed between one of said input terminals and the control terminal of said second sub-switching element (Q12),
said Zener diode (ZD) being disposed so as to apply reverse bias to the voltage between said one of said input terminals and said common potential terminal (e) on the side of said primary coils.

What is claimed is:
1. A power factor correction device comprising:
(a) first, second, and third input terminals to which three-phase alternating current (AC) is inputted;
(b) a positive electrode terminal and a negative electrode terminal;
(c) first, second, and third transformers having primary coils with first ends respectively connected to the first, second, and third input terminals and secondary coils with first ends respectively connected to the negative electrode terminal;
(d) one or more switching elements having control ends controlled so as to selectively open and close a current path between second ends of the primary coils of the first, second, and third transformers and a common potential terminal on a side of the primary coils;
(e) first, second, and third rectifying devices respectively disposed between second ends of said secondary coils of the first, second, and third transformers and the positive electrode terminal so as to pass current flow into the positive electrode terminal when the second ends of the secondary coils have forward-biased potentials and block current flow into the positive electrode terminal when the second ends of the secondary coils have reverse-biased potentials; and
(f) a smoothing condenser disposed between the positive electrode terminal and the negative electrode terminal; wherein
(g) the control ends of the one or more switching elements are controlled by a single control signal having a constant duty ratio; and
wherein one of the one or more switching elements comprises a first sub-switching element and a second sub-switching element,
the first sub-switching element having a control end having an end connected to the common potential terminal and on-off controlled so as to pass or interrupt the current flowing into the primary coils, and the second sub-switching element being disposed between the first sub-switching element and the primary coil in serial alignment with the first sub-switching element and having a control end, and
wherein the power factor correction device further comprises
a Zener diode (ZD) disposed between the connecting point of the first and second sub-switching elements and the control terminal of the second sub-switching element, and a resistance element disposed between one of the input terminals and the control terminal of the second sub-switching element, the Zener diode being disposed so as to apply reverse bias to the voltage between the one of the input terminals and the common potential terminal on the side of the primary coils.

2. The power factor correction device of claim 1, wherein the one or more switching elements comprise first, second, and third switching elements respectively disposed between the second ends of the primary coils of the first, second, and third transformers and the common potential terminal on the side of the primary coils.

3. The power factor correction device of claim 1, wherein the one or more switching elements comprise a single switching element disposed between the second ends of the primary coils of the first, second, and third transformers and the common potential terminal on the side of the primary coils.

4. The power factor correction device of claim 1, further comprising fourth, fifth, and sixth rectifying devices passing reflux current flow from the common potential terminal into the first, second, and third input terminals by way of the primary coils of the first, second, and third transformers.

5. The power factor correction device of claim 1, further comprising fourth, fifth, and sixth rectifying devices passing direct reflux current flow from the common potential terminal into the first, second, and third input terminals.

6. The power factor correction device of claim 1, further comprising a duty ratio controller which is applied to a pulse width modulation (PWM) control integrated circuit (IC) having an output terminal outputting the control signal and a control terminal inputted with a duty ratio control voltage for controlling the duty ratio of the control signal, the duty ratio controller having:

a voltage detecting member detecting AC input voltage inputted into the power factor correction device and generating DC detection voltage proportional to the detected AC input voltage, a current path passing current which is variable in accordance with the variation of the generated DC detection voltage, a first resistance element disposed on the current path and having a variable resistance value, and a second resistance element disposed on the current path and having a constant resistance value, the first and second resistance elements being serially aligned, whereby the current passing through the second resistance element is controlled by adjusting the resistance vale of the first resistance element, and the end-to-end voltage of the second resistance element is outputted to the PWM control IC as the duty ratio control voltage.

7. The power factor correction device of claim 1, wherein the one or more switching elements comprise a single switching element disposed between the second ends of the primary coils of the first, second, and third transformers and the common potential terminal on the side of the primary coils; and further comprising fourth, fifth, and sixth rectifying devices passing direct reflux current flow from the common potential terminal into the first, second, and third input terminals.

8. The power factor correction device of claim 2, further comprising fourth, fifth, and sixth rectifying devices passing direct reflux current flow from the common potential terminal into the first, second, and third input terminals.

9. The power factor correction device of claim 2, further comprising fourth, fifth, and sixth rectifying devices passing reflux current flow from the common potential terminal into the first, second, and third input terminals by way of the primary coils of the first, second, and third transformers.

\* \* \* \* \*